United States Patent [19]

Maruyama et al.

[11] Patent Number: 5,481,140
[45] Date of Patent: Jan. 2, 1996

[54] DEMAND CONTROL APPARATUS AND POWER DISTRIBUTION CONTROL SYSTEM

[75] Inventors: Kazuhiro Maruyama; Masahiro Inoue; Noriyuki Kushiro; Rieko Iwatsubo, all of Kamakura, Japan

[73] Assignee: Mitsubishi Denki Kabushiki Kaisha, Tokyo, Japan

[21] Appl. No.: 26,552

[22] Filed: Mar. 4, 1993

[30] Foreign Application Priority Data

Mar. 10, 1992 [JP] Japan .................................. 4-051941
Mar. 30, 1992 [JP] Japan .................................. 4-074634

[51] Int. Cl.$^6$ .................................................. H02J 3/06
[52] U.S. Cl. .............................. 307/11; 307/33; 307/38; 307/39; 364/492
[58] Field of Search ..................... 307/35, 38, 39, 307/40, 85, 11; 364/492

[56] References Cited

U.S. PATENT DOCUMENTS

| | | | |
|---|---|---|---|
| 4,161,028 | 7/1979 | Davis et al. ............. | 364/492 |
| 4,283,635 | 8/1981 | Balmer .................... | 307/35 |
| 4,349,879 | 9/1982 | Peddie et al. ............ | 364/492 |
| 4,464,724 | 8/1984 | Gurr et al. . | |
| 4,694,192 | 9/1987 | Payne et al. . | |
| 4,731,547 | 3/1988 | Alenduff et al. ......... | 307/85 |
| 4,771,185 | 9/1988 | Feron et al. . | |

FOREIGN PATENT DOCUMENTS 0372961 7/1989 European Pat. Off. .

OTHER PUBLICATIONS

Experiments for proving centralized load control (air–conditioner controlling) for 1991 Convention of Power & Energy Section EES.

Primary Examiner—William M. Shoop, Jr.
Assistant Examiner—Albert Paladini
Attorney, Agent, or Firm—Wolf, Greenfield & Sacks

[57] ABSTRACT

The present invention relates to a power distribution control system for suppressing a total quantity of working current in a group of loads to a level equal to or lower than a set quantity of current by controlling the loads. The power distribution control system includes a central communication terminal and a plurality of customer communication terminals connected to the center communication terminal through communication lines. Each of the customer communication terminals is responsive to a presentation signal from the center communication terminal that requests time periods for, and quantities of power reduction. The central communication terminal also provides a response signal to selected customer communication terminals. The response signal indicates that a proposal for power reduction by the customer has been accepted.

33 Claims, 27 Drawing Sheets

SETTING MOTION SCHEDULE

```
              5:00 AM          6:00 AM          7:00 AM
              |                |                |
                                   OPERATION
                                  TIME PERIOD
RICE COOKER 9(1)A                 |-----------|
                                OPERATION
                                TIME PERIOD
WATER HEATER 7(1)A              |-------------|

AIR CONDITIONER 12A       |-------------------|

TOTAL QUANTITY             7 | 19 |    28
OF CURRENT (A)            |--|----|---------|
```

Fig. 23

MOTION SCHEDULE AFTER AUTOMATIC ADJUSTMENT

```
              4:00 AM    5:00 AM    6:00 AM    7:00 AM
              |          |          |          |
                                OPERATION    HEAT
                               TIME PERIOD  RETAINING
RICE COOKER 9(1)A              |----------|----------|
                                    9A         1A
              OPERATION
WATER         TIME PERIOD         HEAT RETAINING
HEATER 7(1)A  |----------|---------------------------|
                  7A                    1A
                                          OPERATION
                                         TIME PERIOD
AIR CONDITIONER 12A                      |----------|
                                             12A
TOTAL QUANTITY   |----------|----------|----------|
OF CURRENT (A)       7A         10A         13A
```

DEMAND CONTROL APPARATUS AND POWER DISTRIBUTION CONTROL SYSTEM

BACKGROUND OF THE INVENTION

1. Field of the Invention

The present invention relates to a demand control apparatus for reducing the total power used by a group of loads and a power distribution control system for distributing an electric power by transmitting and receiving signals between the terminal of an electric power company and the terminals of houses, factories and the like.

2. Description of the Related Art

Recently, many consumers have been widely attempting to save the energy by setting the maximum working power level or power demand value to suppress the total quantity of electric power consumed within the range defined by the set demand value.

The conventional demand control systems are known to be of such a type that a warning or control command is produced for a load or loads in which the input power exceeds the set power level or that any load having a larger working power is preferentially shut off, as described in Japanese Patent Laid-Open No. Sho 57-71233. There is also known a demand control apparatus which comprises a plurality of loads classified into on-off controllable loads and producing loads so that when the working power level consumed exceeds the set demand level, the number of producing loads are first reduced to control the working power level into a target level and the on-off controllable loads will be finally shut off, as described in Japanese Patent Laid-Open No. Sho 57-101526. Japanese Patent Laid-Open No. Sho 55-108048 further describes a demand control apparatus which can produce a failure signal when the total quantity of electric power consumed exceeds the target level even if all the loads to be controlled are controllably shut off.

However, the demand control apparatus described in Japanese Patent Laid-Open No. Sho 57-71283 requires the registration of an electric working power. Although the system can effectively suppress the working power level below the set demand level since any load having a larger working power is preferentially shut off, the sequence of preference cannot be changed depending on the magnitude of working power so that the electric power will be effectively used within the range defined by the set demand value. The demand control apparatus of the Japanese Patent Laid-Open No. Sho 57-101526 also cannot change the sequence of preference for loads and select the type of instruments to be controlled. Thus, the demand control apparatus cannot be used in houses, factories and others, depending on various situations. Finally, the control system of Japanese Patent Laid-Open No. Sho 55-103043 can only generate a failure signal without carrying out any actual procedure.

The conventional demand control systems raises a further problem when any one of the loads or instruments is shut off. For example, when a plurality of instruments such as a rice cooker, a water heater, an air conditioner and so on are used in a typical house in the morning, if any one instrument is shut off, it will be very inconvenient.

Energy produced in the power plant of an electric power company is mainly distributed to houses, factories and others. In recent years, the power consumption has greatly changed throughout the year. In general, the power consumption is on peak in the summer daytime while it is off peak in the winter nighttime. The power installation is constructed to cope with the on-peak power consumption.

As the power demand in typical houses increases with the spread of air conditioners, the difference between on-peak and off-peak energy consumption increases. As a result, the annually averaged load or annual load factor for the service capability gradually decreases. The production cost is also increasing. Therefore, the leveling of loads is urgently required.

In order to accomplish the leveling, there has been proposed a system wherein the power supply to loads such as air conditioners is forcedly shut off depending on the need of the energy supplier, irrespective of the customers' needs. Instead, incentive payments are paid back to the customers. For example, in U.S.A., the electric power company computes a tariff from an expected power consumption based on a predicted energy factor for a customer before one day. The computed tariff is one-sidedly reported from the electric power company to the customer. Such a system is called "spot tariff system".

Literature "Actual Proof and Test for concentrically Controlling Loads (Control of Air Conditioners)" in JEC, Convention of Electric Power and Energy Department, 1991 proposed a method for intermittently stopping the power supply to the air conditioners. Although such a method is effective to reduce the on-peak energy consumption, circumstances on the side of houses, factories and others will be completely ignored. Furthermore, the spot tariff system cannot provide a remarkably improved advantage since the predicted demand will not accurately reflect variations in demand due to variable weather. When the air conditioners are intermittently shut off, the leveling of all the loads cannot be effectively accomplished since the instruments to be controlled are limited to the air conditioners.

It is therefore an object of the present invention to provide a demand control apparatus which can properly set the total quantity of working energy for a group of loads below a given level depending on circumstances of houses, factories and so on and to provide a power distribution system which can properly distribute the electric energy and level the loads depending on variations of demand through time and circumstances of houses, factories and other customers.

SUMMARY OF THE INVENTION

To this end, the present invention provides a demand control apparatus comprising a power detecting means and a re-start controlling means, the power detecting means being adapted to compute the level of working power for each load from a difference between the total working power level between before and after shut-off in that load. After the power supply has been shut off to the load in accordance with its set priority level, the re-start controlling means compares a difference between the set power level and the present total quantity of working power with the value of working power of each load so that one or more loads will be re-started in accordance with the priority level within the range defined by the difference. Thus, the electric power can be more effectively used according to the demand level.

The demand control apparatus of the present invention may comprise a registration means and a shut-off control means. In such a case, among loads which are in their on-state and placed at or below the set power level, one or more loads in which the total quantity of working power is at or below the set power level is (or are) selected in accordance with tile priority level. All the loads other than the selected loads are shut off. Thus, the apparatus will not be required to de-energize it once.

The demand control apparatus may include a setting section and a control section, in such a case, the apparatus can select any load to be controlled from a group of loads connected thereto and arbitrarily determine the priority level in the selected load. Therefore, the demand can be controlled depending on circumstances of houses and other customers. Further, the setting can be more easily made since it is not required that the quantity of working power in each of the loads is registered.

The apparatus of the present invention may comprise an operating section, a data base section and a control section. In such a case, the demand will be controlled without turning the loads off, by staggering timings at the respective loads from each other.

In a power distribution control system comprising a center side communication terminal and customer side communication terminals, the electric power can be distributed to houses, factories and other customers to level the loads while considering the variable demand through time and the circumstances of the houses, factories and other customers. Particularly, since a customer makes a bid for the presentation from the center side which in turn makes a successful bid for the customer's bid, the optimum distribution can be made considering circumstances on both the center and customer sides.

BRIEF DESCRIPTION OF THE DRAWINGS

FIG. 23 is a view illustrating a set operation schedule.

FIG. 24 is a view illustrating an adjusted operation schedule.

DETAILED DESCRIPTION OF THE PREFERRED EMBODIMENTS

Figure 1:
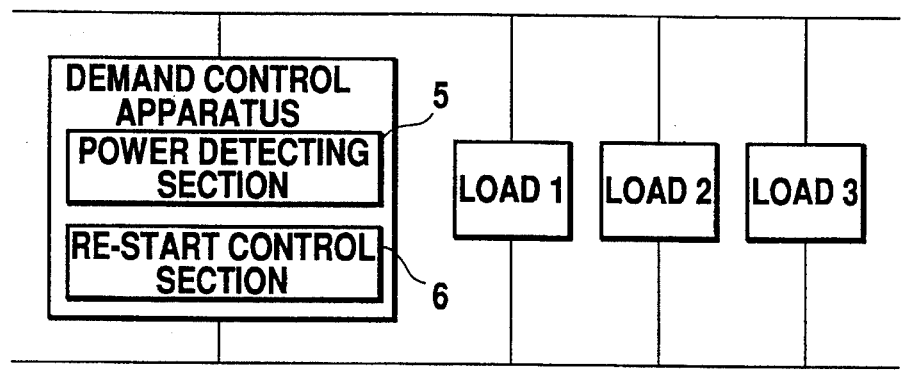
FIG. 1 is a schematic block diagram of a demand control apparatus in accordance wit the first embodiment of the invention.

Referring first to FIG. 1, there is shown a demand control apparatus constructed In accordance with the first embodiment of the present invention. The demand control apparatus is connected to loads 1, 2 and 3 and adapted to shut off the power supply to the respective loads in accordance with the set priority level so that the total quantity of working power in the group of loads will be maintained at or below a power setting level. The control of the demand control apparatus is carried out in such a manner as shown in FIG. 2.

For simplification, it is now assumed that two instruments, that is, one instrument a having its working current equal to 10 A and another instrument b having its working current equal to 5 A are used. It is also assumed that the set demand level is equal to 8 A and that the priority level of the instrument a is higher than that of the instrument b. When both the instruments are turned on, the total quantity of working current becomes equal to 15 A which will exceed the demand level. Thus, the demand control apparatus will shut off the power supply to the instrument b having its lower priority level. The total quantity of working current becomes equal to 10 A. However, this also exceeds the set demand level. Consequently, the instrument a will be also shut off.

Figure 2:
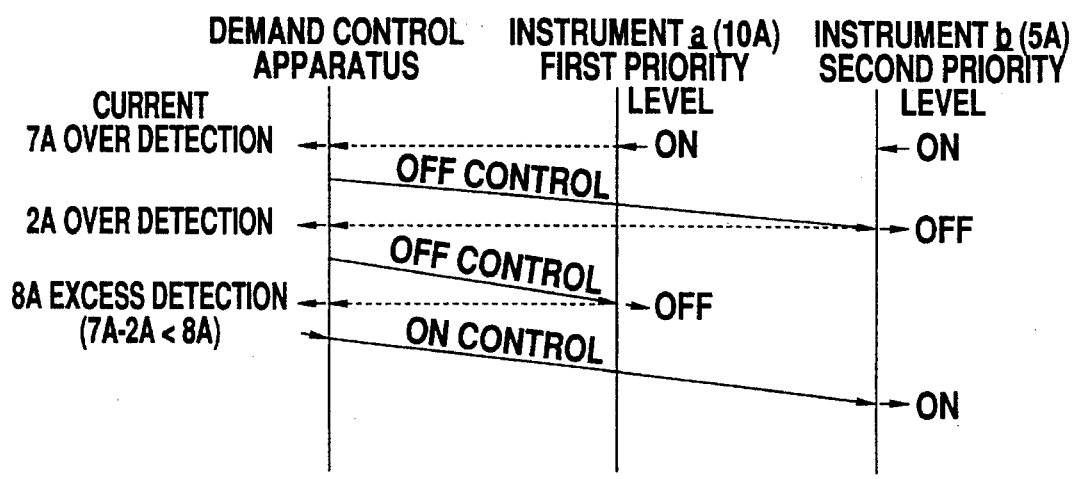
FIG. 2 is a view illustrating the sequence of control in the demand control apparatus shown in FIG. 1.

The demand control apparatus comprises a power detecting section or means 5 for computing the amount of working current in an instrument when it is shut off from the power supply, the computation being based on a difference between the total quantities of working current in that instrument before and after shut-off, as shown in FIG. 2. It is now judged by the power detecting section 5 that the quantity of working current in the instrument a is 10 A while that of the instrument b is 5 A.

The demand control apparatus also comprises a re-start control section or means 6 for comparing a now permissible quantity of current with the quantity of current in a load and for re-starting that load according to its priority level within the range defined by the permissible quantity of current. The re-start control section 6 first compares the permissible quantity of current with the quantity of working current in the instrument a having the highest priority level. Since the quantity of working current in the instrument a exceeds the permissible level, it will not be re-started by the re-start control section 6. Subsequently, the quantity of working current in the instrument b is compared with the permissible quantity of current. Since the quantity of working current in the instrument b is within the permissible range, it will be re-started. If an instrument c having its quantity of working current equal to 2 A is connected to the demand control apparatus in addition to the instruments a and b, the instrument c will be restarted since its quantity of working current is within the permissible range.

Figure 3:
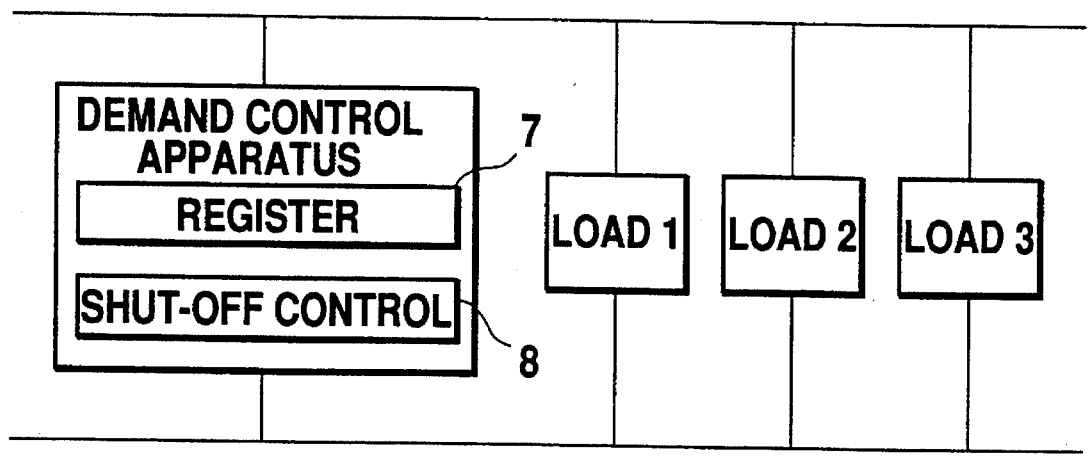
FIG. 3 is a schematic block diagram of a second embodiment of a demand control apparatus.
Figure 4:
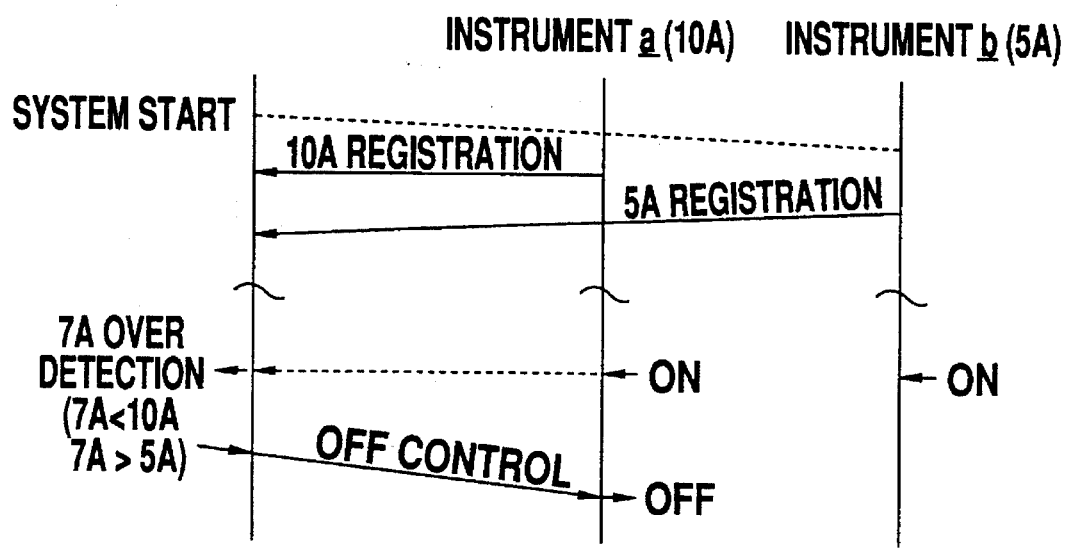
FIG. 4 is a view illustrating the procedure of control in the demand control apparatus shown in FIG. 3.

Preferring now to FIGS. 3 and 4, there is shown the second embodiment of a demand control apparatus constructed in accordance with the present invention. The demand control apparatus comprises a registration section or means 7 for registering the quantity of working current in each of the loads connected to the demand control apparatus. The registration section 7 has previously stored the quantities of working current in the instruments a and b which are equal to 10 A and 5 A, respectively. When the instruments a and b are turned on in such a situation, the total quantity of working current will exceed the demand value equal to 8 A. The demand control apparatus also comprises a shut-off control section or means 8 for comparing the demand value with the quantity of working current in each load and for selecting a load from the on-state loads within the range defined by the set quantity of current in the priority level so that the total quantity of working current will be equal to or less than the demand value, all the loads other than the selected load being shut off. The demand control apparatus first compares the instrument a having the highest priority level with the demand value. Since the quantity of working current in the instrument a is higher than the demand value, it will not be selected by the shut-off control section 8. The quantity of working current in the instrument b is then compared with the demand value. Since the quantity of working current in the instrument b becomes equal to the demand value, it will be selected by the shut-off control section 8, with the other instrument a being shut off from the power supply. If an instrument c having its quantity of working current equal to 2 A is connected to the demand control apparatus in addition to the instruments a and b, the instruments b and c will be selected since the total quantity of working current in the instruments b and c is below the demand value. Only the instrument a will be shut off from the power supply.

Figure 5:
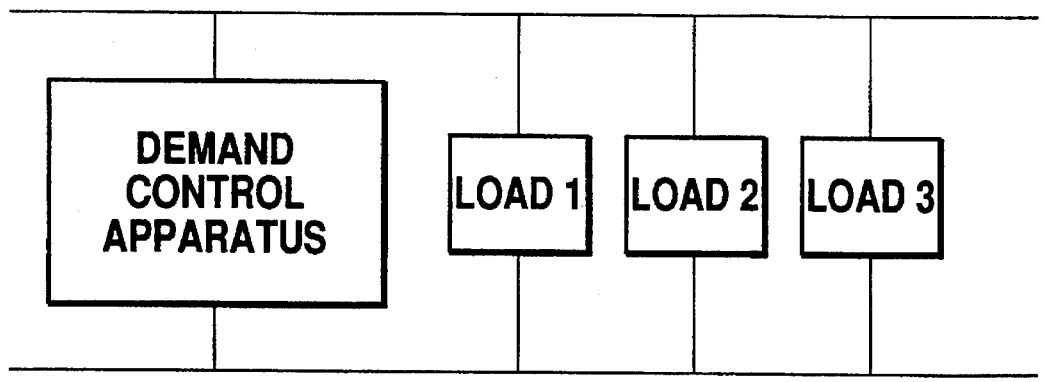
FIG. 5 is a schematic block diagram of a third embodiment of a demand control apparatus.
Figure 6:
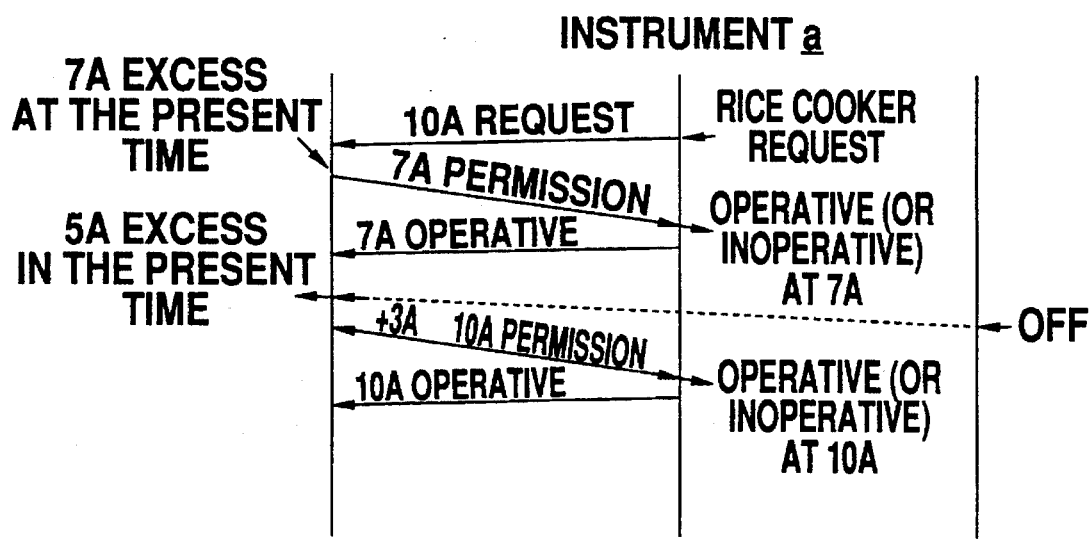
FIG. 6 is a view illustrating the procedure of control in the demand control apparatus shown in FIG. 5.

FIG. 5 shows the third embodiment of a demand control apparatus constructed in accordance with the present invention while FIG. 6 shows the shut-off control of this demand control apparatus. It is now assumed that the currently permissible quantity of current is equal to 7 A while the quantity of working current in the instrument a is equal to 10 A and also that the instrument a is a rice cooker. When the instrument a outputs a cooking request signal, the demand control apparatus permits the instrument a to be started on 7 A since its permissible quantity of current is 7 A. The instrument a reports the fact that the current equal to 7 A was used therein to the demand control apparatus. If any other instrument is turned off to permit a new quantity of working current equal to 5 A, an additional equal to 3 A is permitted in the instrument a. Thus, the instrument a will be capable of working with the quantity of working current equal to 10 A. This will be reported from the instrument a to the demand control apparatus.

Figure 7:
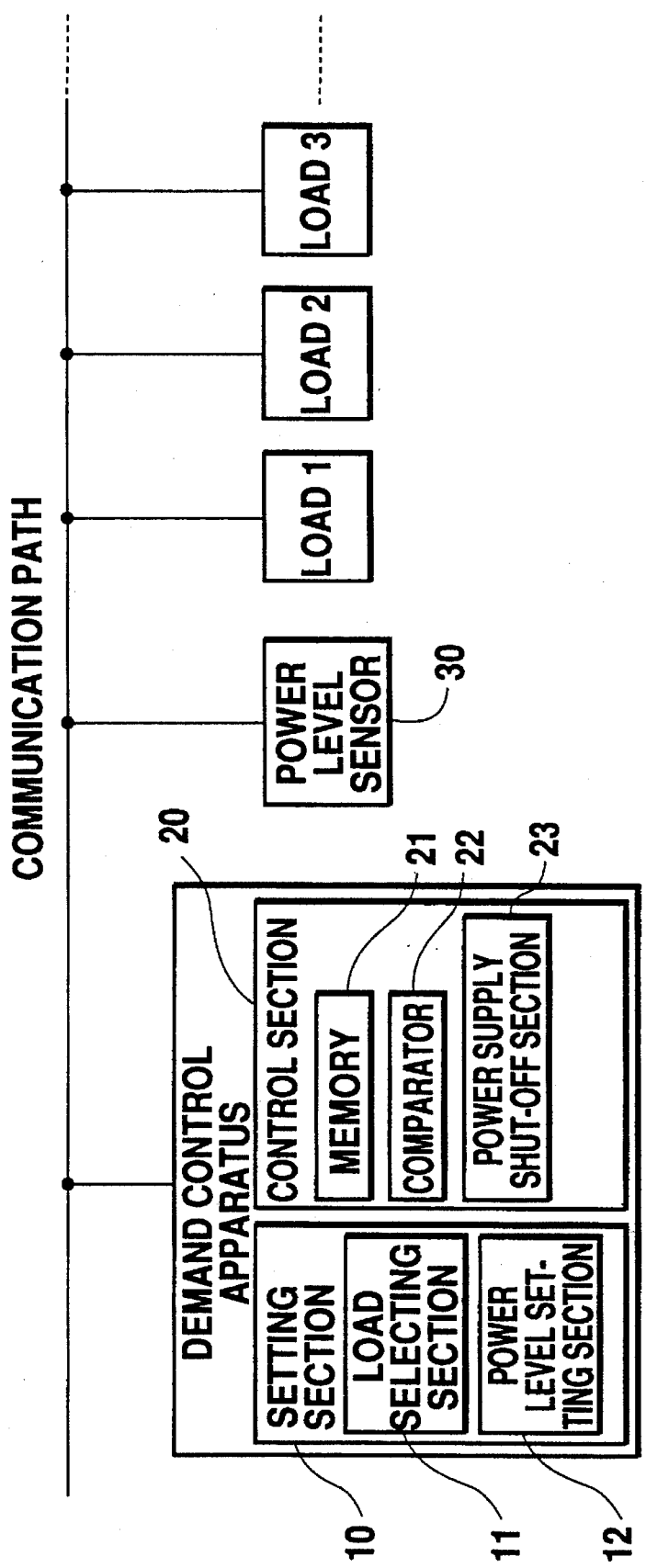
FIG. 7 is a schematic block diagram of a fourth embodiment demand control apparatus.

Referring now to FIG. 7, there is shown the fourth embodiment of a demand control apparatus constructed in accordance with the present invention, which is mainly adapted to control domestic loads. The demand control apparatus comprises a setting section 10 and a control section 20 and is connected to loads 1, 2 and 3 and an electric energy sensor 30. The sensor 30 is adapted to detect the total quantity of working current in the loads.

The setting section 10 comprises a load selecting section or means 11 and a power setting section or means 12. The load selecting section 11 is adapted to select and set one or more loads to be controlled from the loads 1, 2 and 3 with their priority levels being specified. The power setting section 12 is adapted to set a target power value for controlling the loads, the target power value being variable.

The control section 20 comprises a memory section or means 21, a comparator section or means 22 and a power supply shut-off section or means 23. The memory section 21 is adapted to store the selection of load by the load selecting section 11, the priority level of the selected load and the target power value set by the power setting section. The comparator section 22 compares the stored target power value with the total quantity of working current. The power supply shut-off section 23 utilizes data from the comparator section 22 to shut off the power supply in accordance with the selection of load and the priority level which have been stored in the memory section 21.

Figure 8:
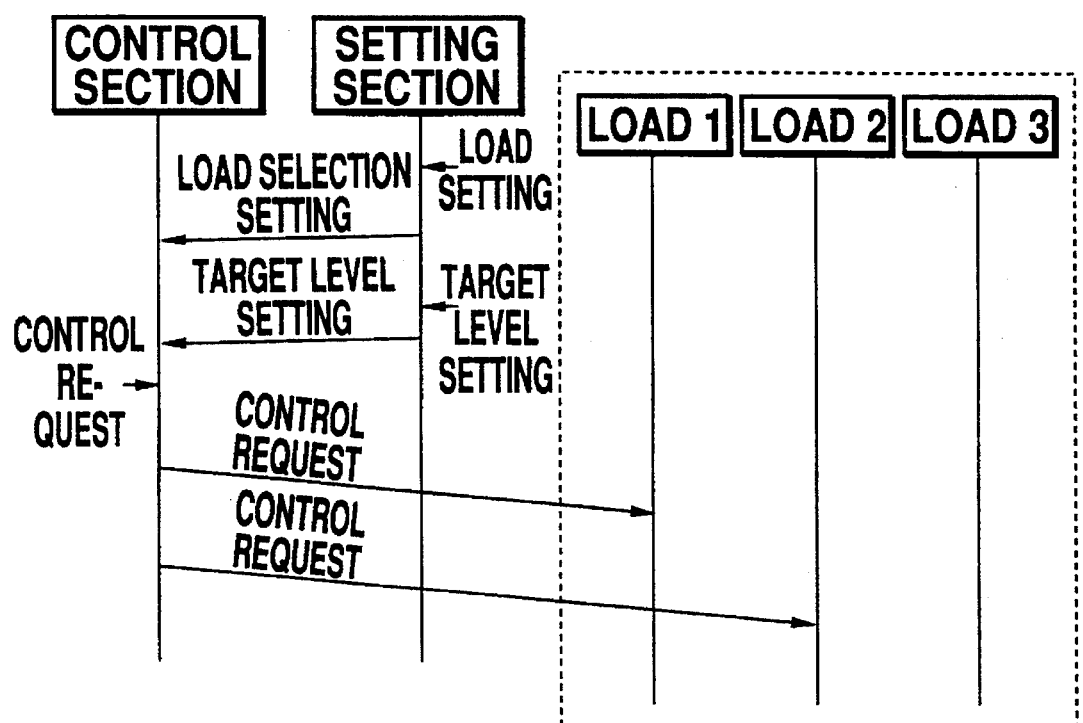
FIG. 8 is a view illustrating the sequence of control in the demand control apparatus shown in FIG. 7.

The setting section 10 comprises a load selecting section 11 and a power setting section 12 and is adapted to perform the load selection and setting and the setting of the target value, as shown in FIG. 8. The load setting operation load selects one or more loads to be controlled from the group of loads. At this time, a priority level is provided to each of the selected loads. Any load having a lower priority level is first shut off from the power supply. The setting of tile target value determines a target power value for controlling the loads or a so-called "demand value". The setting section 10 can change the selected load from one to another depending on its priority level and the demand value. The selected load, its priority level and the target power level are reported to the control section 10.

Figure 9:
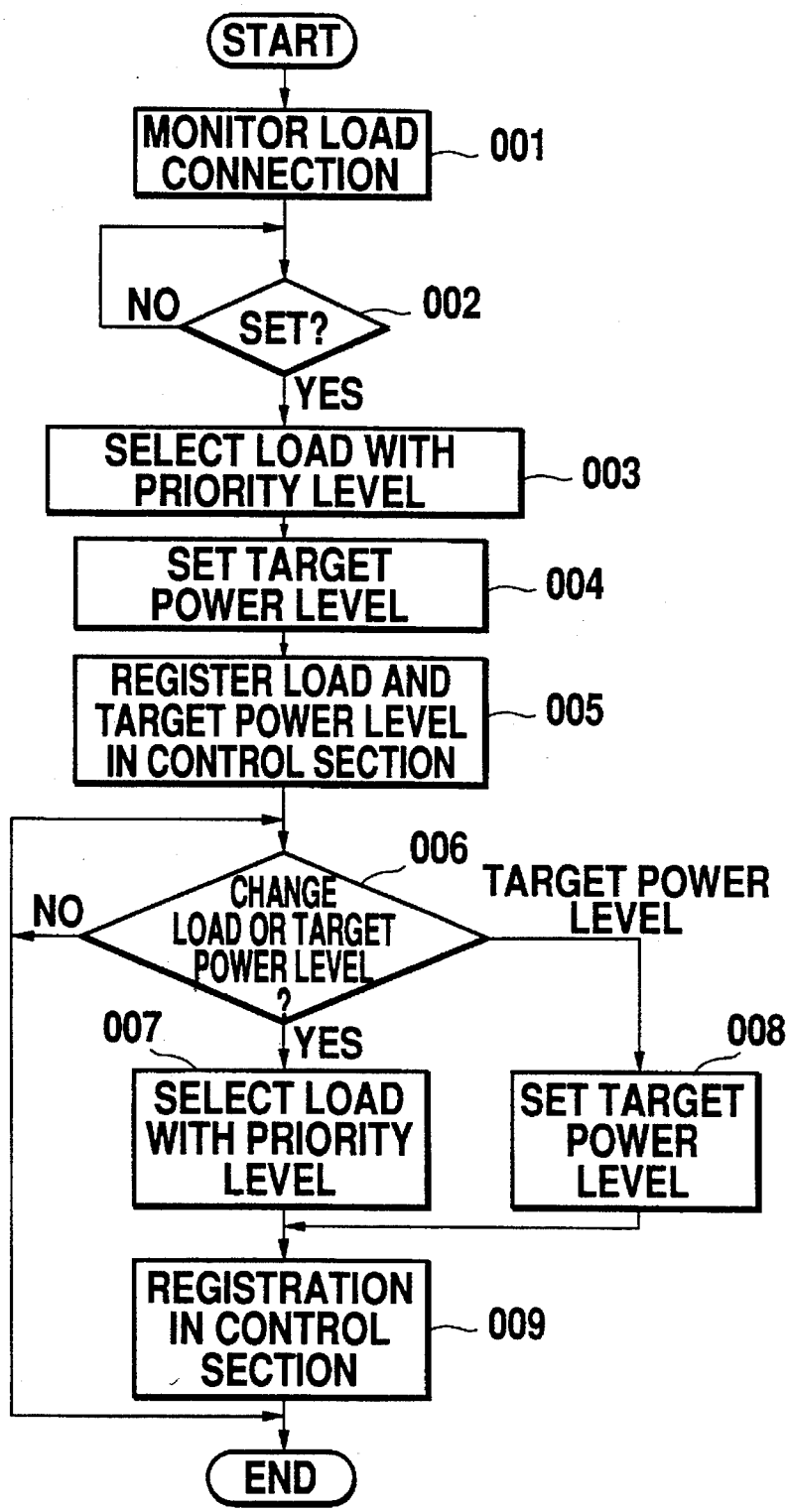
FIG. 9 is a flowchart illustrating the procedure of setting in the setting section.

The load selection and the setting of the priority level and target power level in the setting section 10 will be performed in accordance with a flowchart shown in FIG. 9. What loads are present in the apparatus is monitored (step 001) and it is then selected whether or not the setting is to be made (step 002). Next, the loads are selected providing priority levels to them (step 003). For example. If loads including an air conditioner, a rice cooker, a water heater and an electric carpet are connected to the demand control apparatus and when the "water heater", "rice cooker" and "air conditioner" are selected in the order described, three loads will be selected from four loads so that the water heater has the highest priority level, the rice cooker has the second higher priority level and the air conditioner has the lowest priority level. If the total quantity of working current exceeds the target power level, the water heater, rice cooker and air conditioner will be shut off from the power supply in the order described.

The target power value is then set (step 004). The target power value is not limited to the contract demand and can be set at any level within the range defined by the contract demand. When the selection of load in the setting section 10 is terminated with tile setting of priority level and target power level, these will be reported to and registered in the memory section 21 of the control section 20 (step 005). The control section 20 will control the loads in accordance with these data.

If it is desired to change the initially set contents, the program proceeds to step 006. If the selected load and its priority level are to be changed, the program proceeds to step 007. If the target power level is to be changed, the program proceeds to step 008. The registration is carried out in the memory section of tile control section 20 (step 009). If all the above data is to be changed, the program returns back to step 006.

When the setting is completed and if a control start switch (not shown) in the setting section 10 is turned on, the control program is initiated. The demand control apparatus compares the registered target power value with the total quantity of working current. If the total quantity of working current exceeds the target power level, any selected load having a lower priority level Is first shut off from the power supply. Since the demand control apparatus of the present embodiment comprises the setting and control sections 10, 12 which are separated from each other, it can deal with any development in the setting means.

Figure 10:
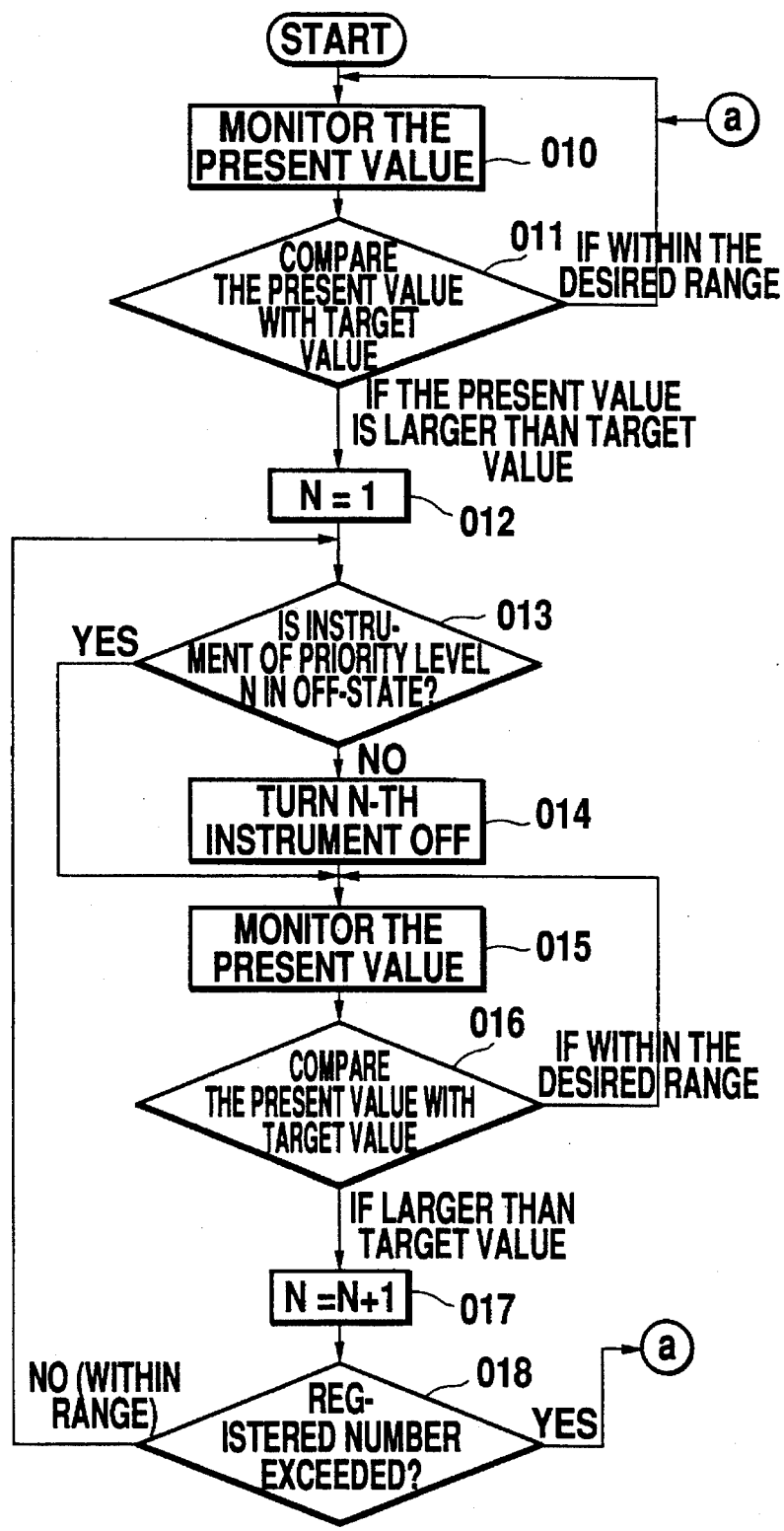
FIG. 10 is a flowchart illustrating the procedure of control in the control section.

The control section 20 is operated in such a manner as is shown in FIG. 10. The total quantity of working current at the present time is first monitored by monitoring the electric energy sensor 30 (step 010). In addition, the comparator section 22 compares the total quantity of working current with the target power level. If the total quantity of working current is equal to or lower than the target power level, the monitoring is continued. If the total quantity of working current exceeds the target power level, the power supply shut-off section 23 judges whether or not the load having the priority highest level is turned off (steps 012 and 013). If that load is not turned off, it will be turned off (step 014) of the load having the highest priority level has been already turned off, the comparing section 22 again monitors the total quantity of working current considering the passage of time (step 015) and compares the total quantity of working current at the present time with the target power level (step 016).

If the total quantity of working current is equal to or lower than the target power level, the monitoring is continued. If the total quantity of working current still exceeds the target power level, the negative number N is incremented (step 017) and it is judged whether or not the number of loads exceeds the registered number (step 018). If the number of loads does not exceed the registered number, the program returns back to step 013 wherein any load having a lower priority level is turned off. When all the loads have been turned off and if the total quantity of working current still exceeds the target power level, the program returns back to step 010. Since the total quantity of working current includes that of any load other than the loads to be controlled, such as an electric carpet, it may exceed the target power level even if all the loads to be controlled are turned off.

Figure 11:
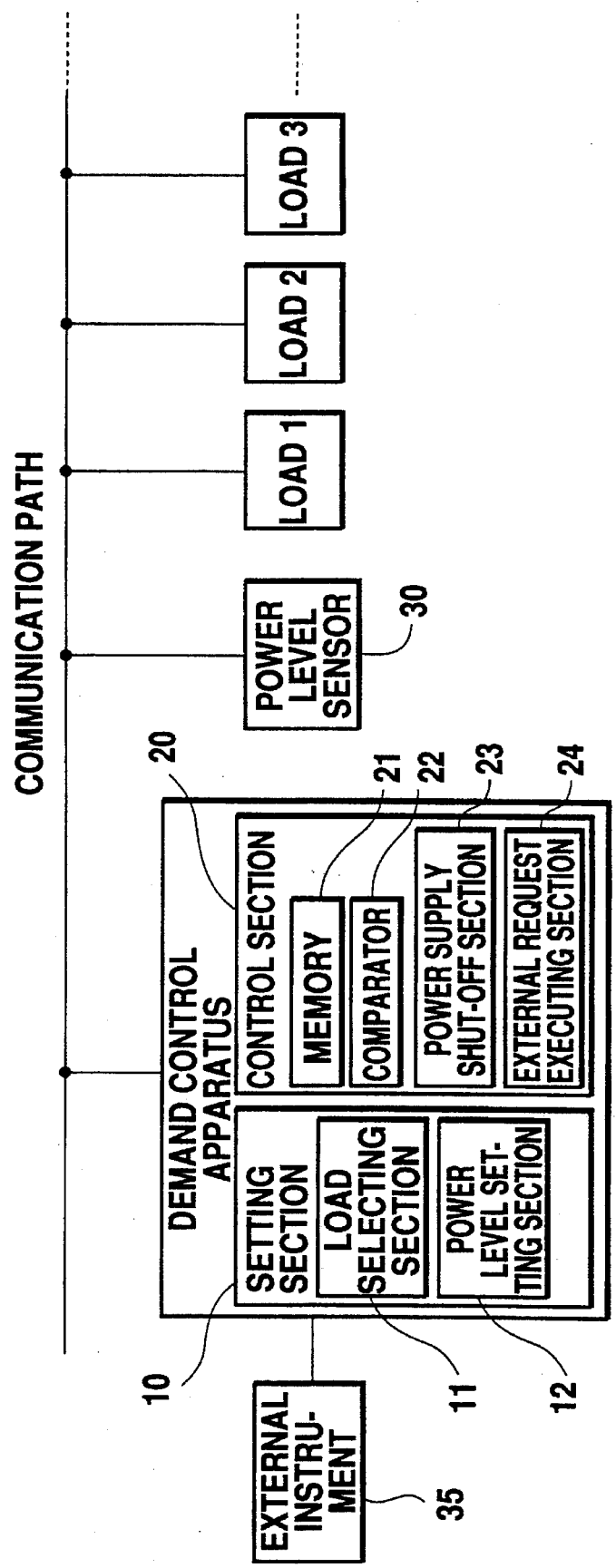
FIG. 11 is a view of a fifth embodiment of a demand control apparatus.
Figure 12:
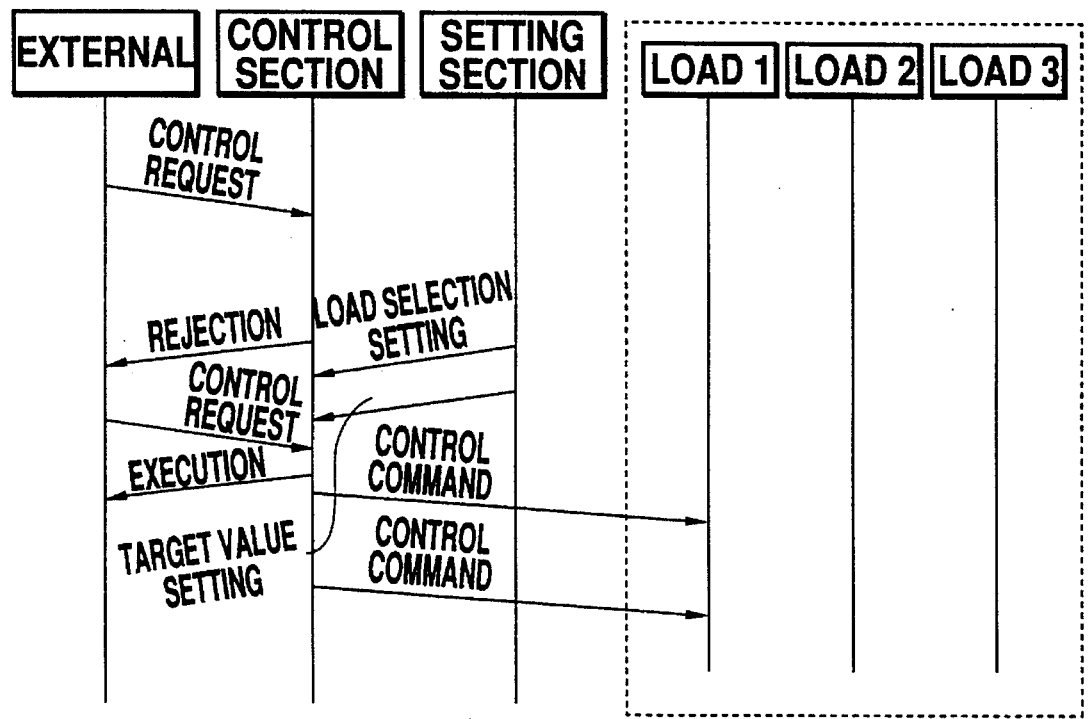
FIG. 12 is a view illustrating the sequence of control in the demand control apparatus shown in FIG. 12.

FIG. 11 shows the fifth embodiment of a demand control apparatus constructed in accordance with the present invention, which is substantially similar to the fourth embodiment. In the fifth embodiment, the demand control apparatus is also connected to an external instrument 35. The control section 20 of this demand control apparatus comprises an external request executing section or means 24. The external instrument 35 is positioned outside a house and mainly belongs to the electric power company. The response to and from the external instrument 35 is performed in such a manner as is shown in FIG. 12. More particularly, the control section 20 of the demand control apparatus provides control commands to the respective loads in response to control requests from the external instrument 35. If the selection of load and the setting of priority level and target power level have been stored, the external request executing section 24 provides control commands to the respective loads in response to control requests from the external instrument 35. If the selection of load and/or the setting of priority level and target power level have not been stored in the control section 20, the external instrument 35 will receive a signal indicative of rejection against the control request thereof, as shown in FIG. 12. When the selection of load and the setting of priority level and target power level have been stored in the control section 20 and if the control section 20 outputs a control signal in response to the control request of the external instrument 35, the latter will receive a signal indicative of execution of the control request.

The demand control apparatus constructed In accordance with the fourth and fifth embodiments can select any load to be controlled from the group of connected loads, with the selected load being capable of being determined with respect to its priority level. Since it is not required to register the quantity of working current in each of the loads, the setting can be more easily made.

Figure 13:
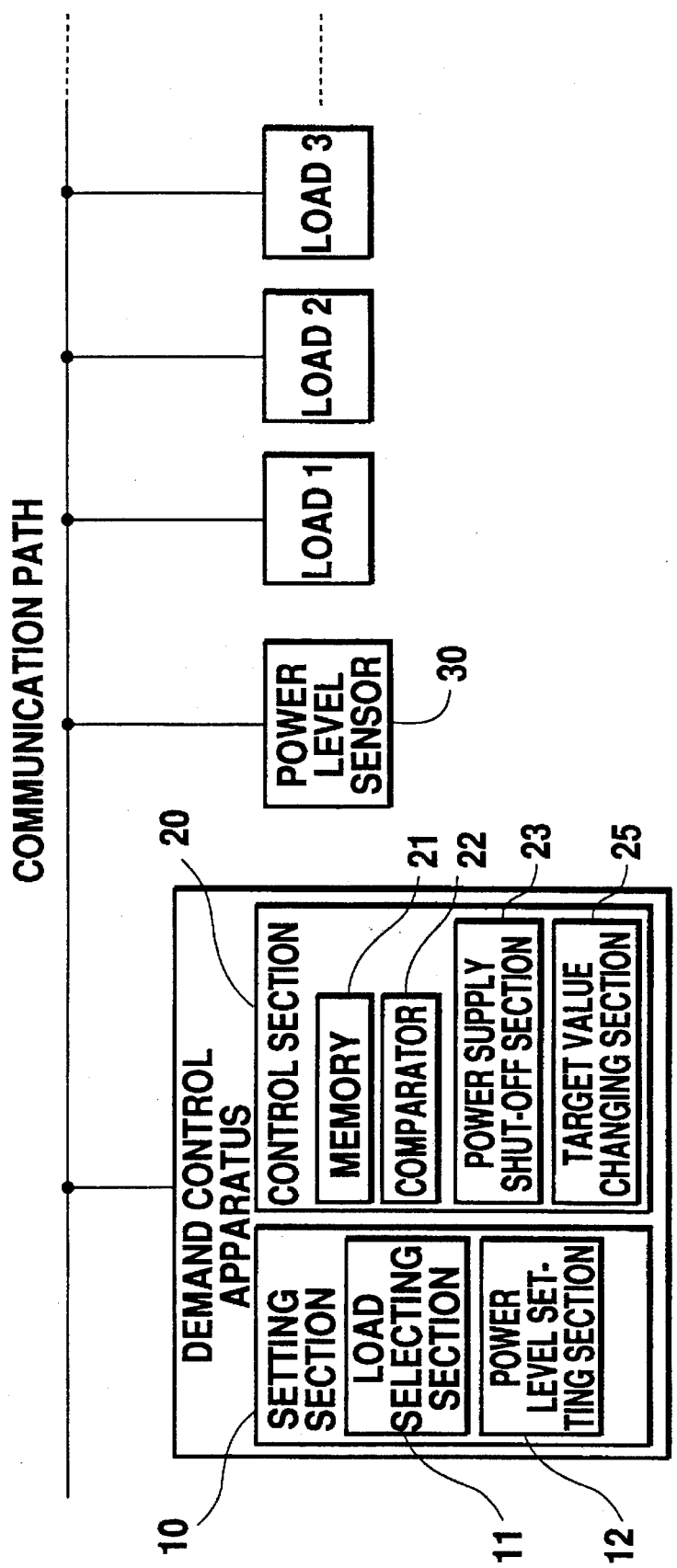
FIG. 13 is a view of a sixth embodiment of a demand control apparatus.

A demand control apparatus constructed in accordance with the sixth embodiment of the present invention is substantially similar to the fourth embodiment except that, as FIG. 13 shows, the sixth embodiment comprises a target level changing section or means 25. If the total quantity of working current exceeds the target power level when all the loads to be controlled are shut off by the control section 20, it is judged to be impossible to control. The total quantity of working current at the present time is changed to the target power level, with a signal including the changed target power level being outputted to the setting section 10.

Figure 14:
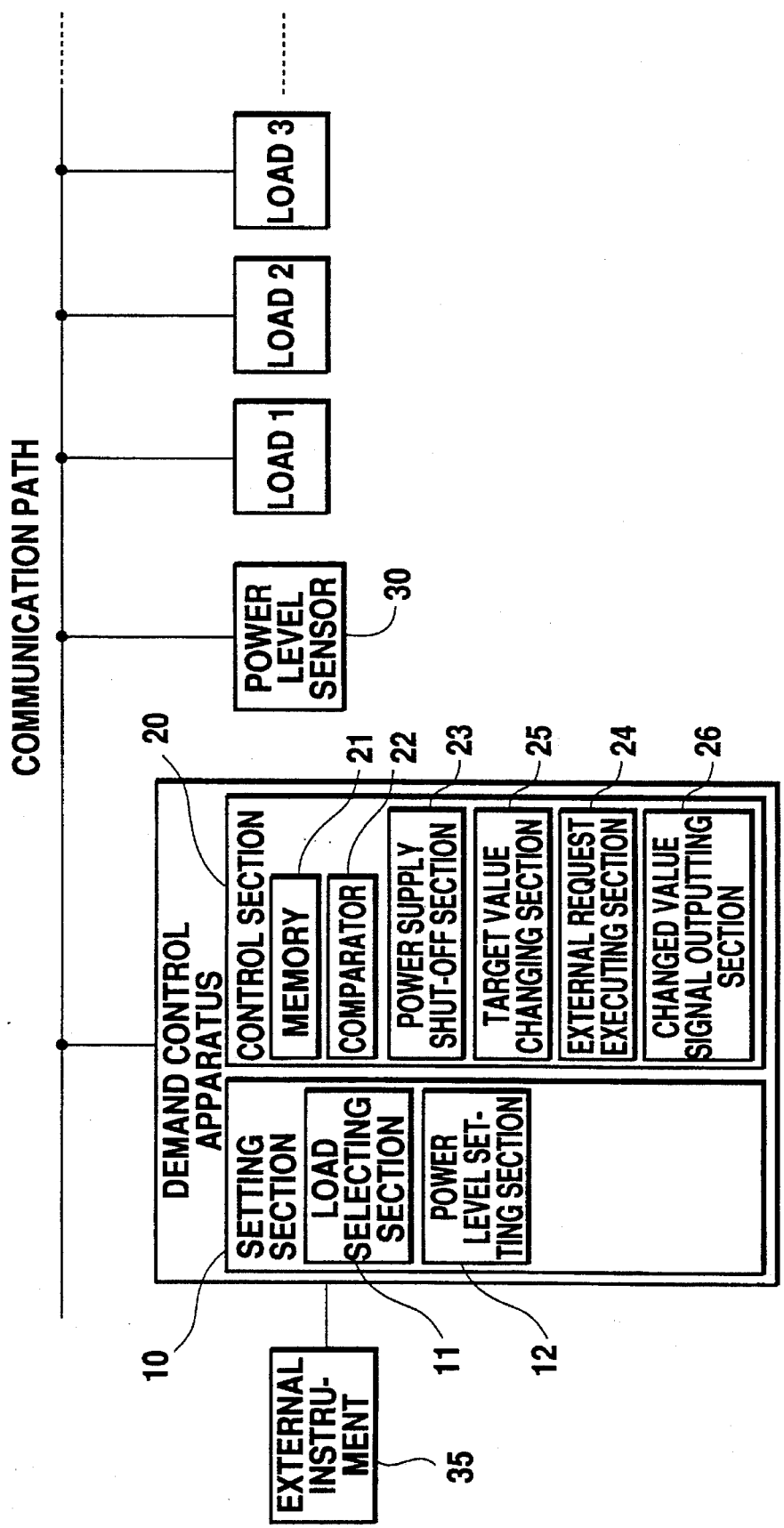
FIG. 14 is a view of a seventh embodiment of a demand control apparatus.
Figure 15:
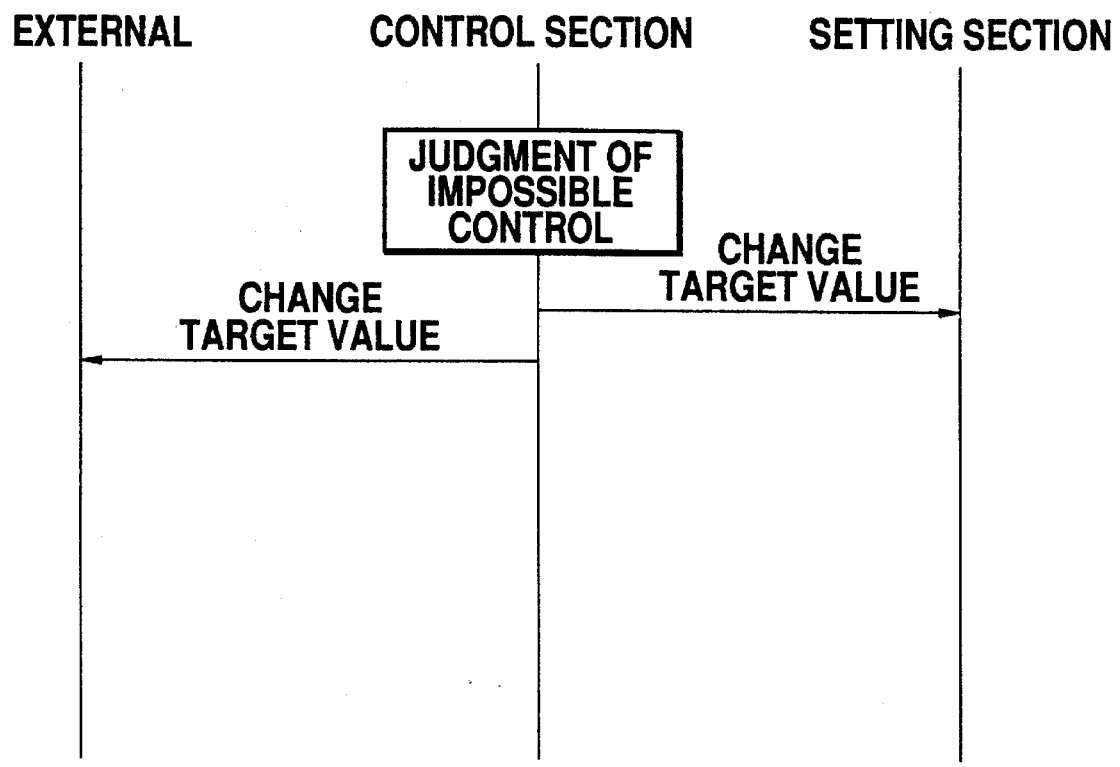
FIG. 15 is a view illustrating the sequence of control in the demand control apparatus shown In FIG. 14.
Figure 16:
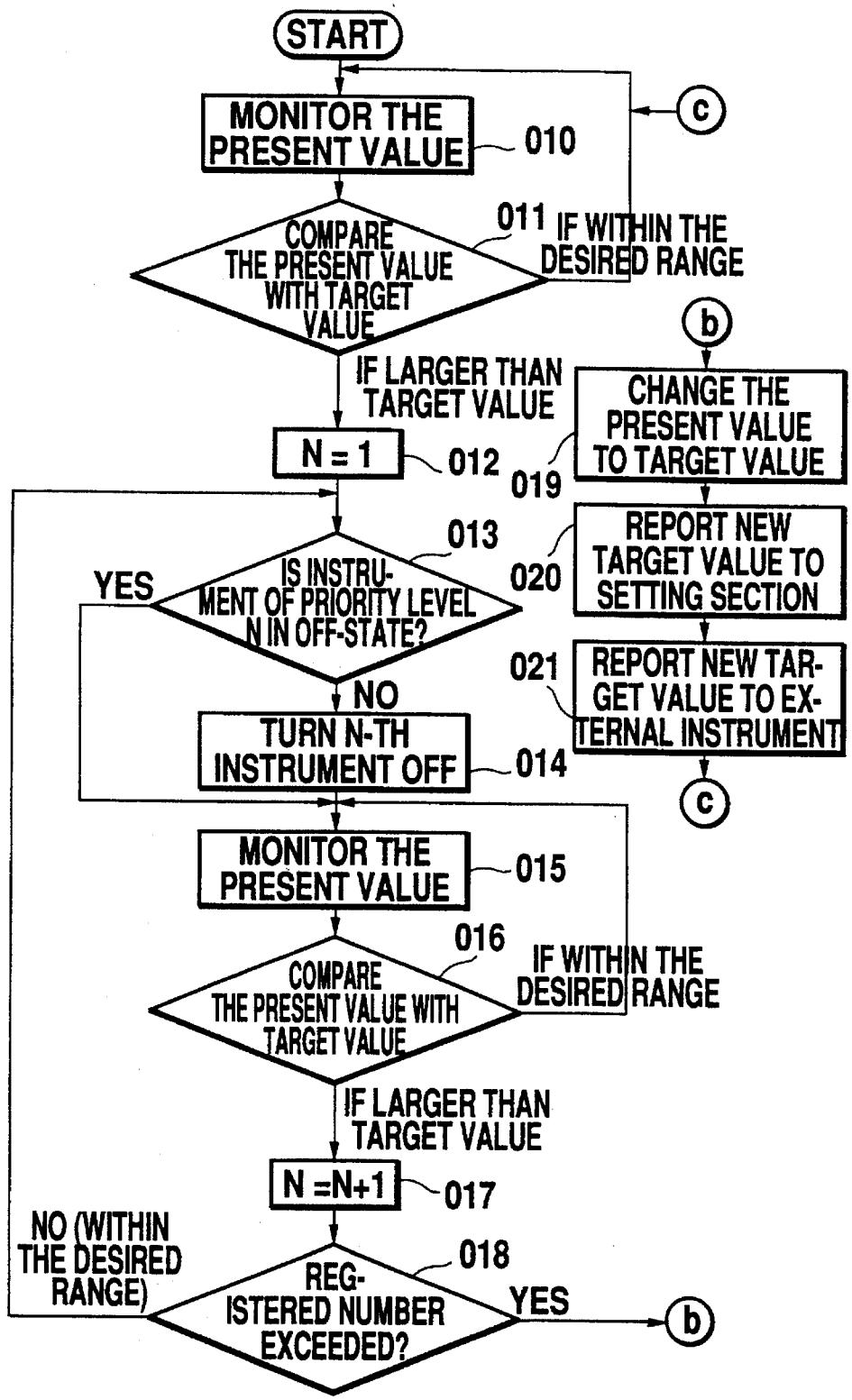
FIG. 16 is a flowchart illustrating the procedure of control in the control section.

FIG. 14 shows the seventh embodiment of a demand control apparatus constructed in accordance with the present invention, in which the demand control apparatus of the sixth embodiment is connected to the external instrument 35. The demand control apparatus comprises a target level changing section 25, an external request executing section 24 and a change signal outputting section or means 26. When the total quantity of working current exceeds the target power level even if all the loads to be controlled are turned off by the control section 20, the target level changing section 25 judges that the control is impossible as shown in FIGS. 15 and 16 and changes the total quantity of working current at the present time to the target power level (step 019). The target level changing section 25 then provides a signal including the changed target power level to the setting section 10. (step 020). The change signal outputting section 26 also provides the signal including the changed target power level to the external instrument 35 (step 021). In FIG. 16, the steps 001 to 020 are common to the sixth embodiment.

The change of target value may be so constructed that any load other than the selected loads is manually controlled or a service breaker is actuated to change the total quantity of working current to a level equal to or lower than the target power level when the total quantity of working current exceeds the target power level even if all the preset loads are turned off. However, this raises a problem in that the former is inconvenient if nobody is in the house and that the latter will shut off any instrument other than the set instruments. Such a problem can be overcome by changing the target power level from one value to another. When the target power level is changed, it raises a problem relating to contract of tariff or tile like since a user considers that the previous target power level is now being used for any external instrument as belongs to the electric power company or the like. If the change of target power level is made, therefore, it is reported to the setting section and the external instrument.

Figure 17:
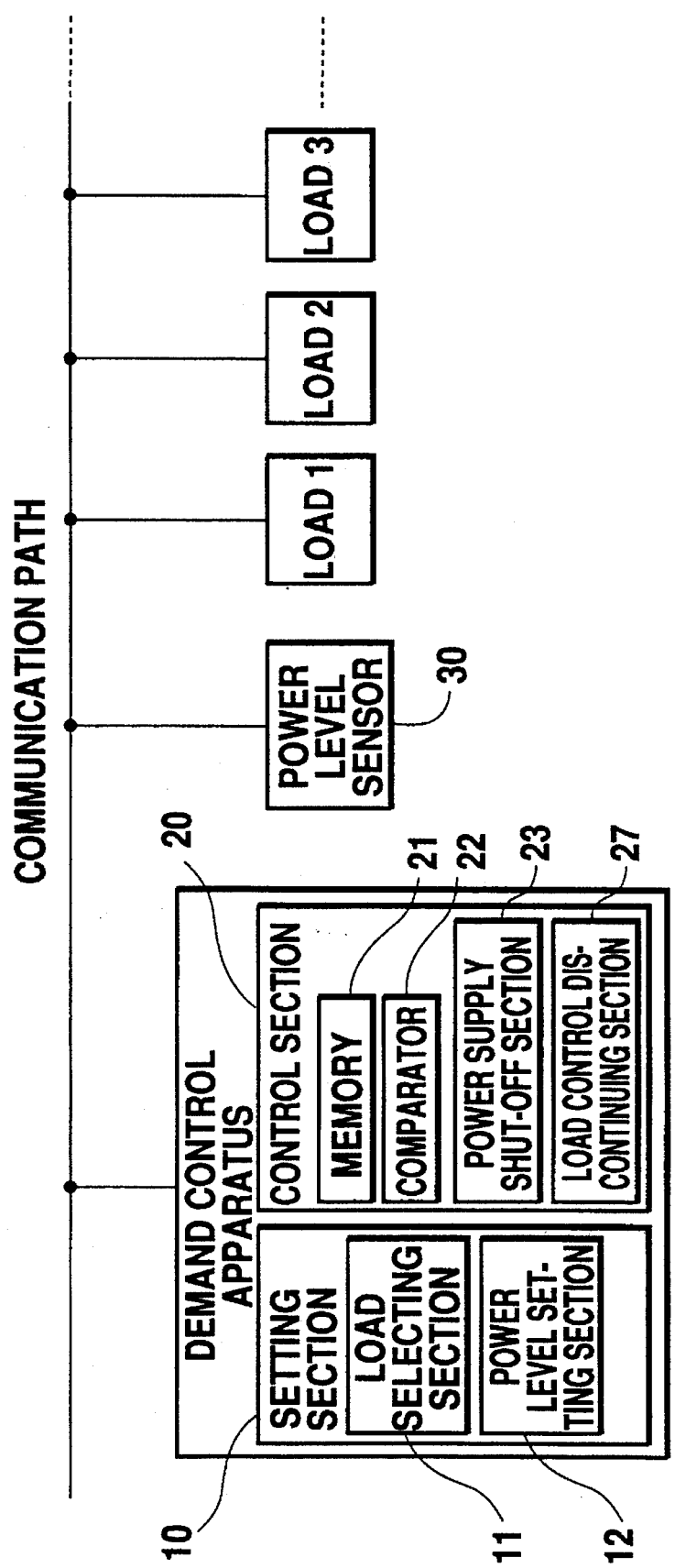
FIG. 17 is a schematic block diagram of an eighth embodiment of a demand control apparatus.
Figure 18:
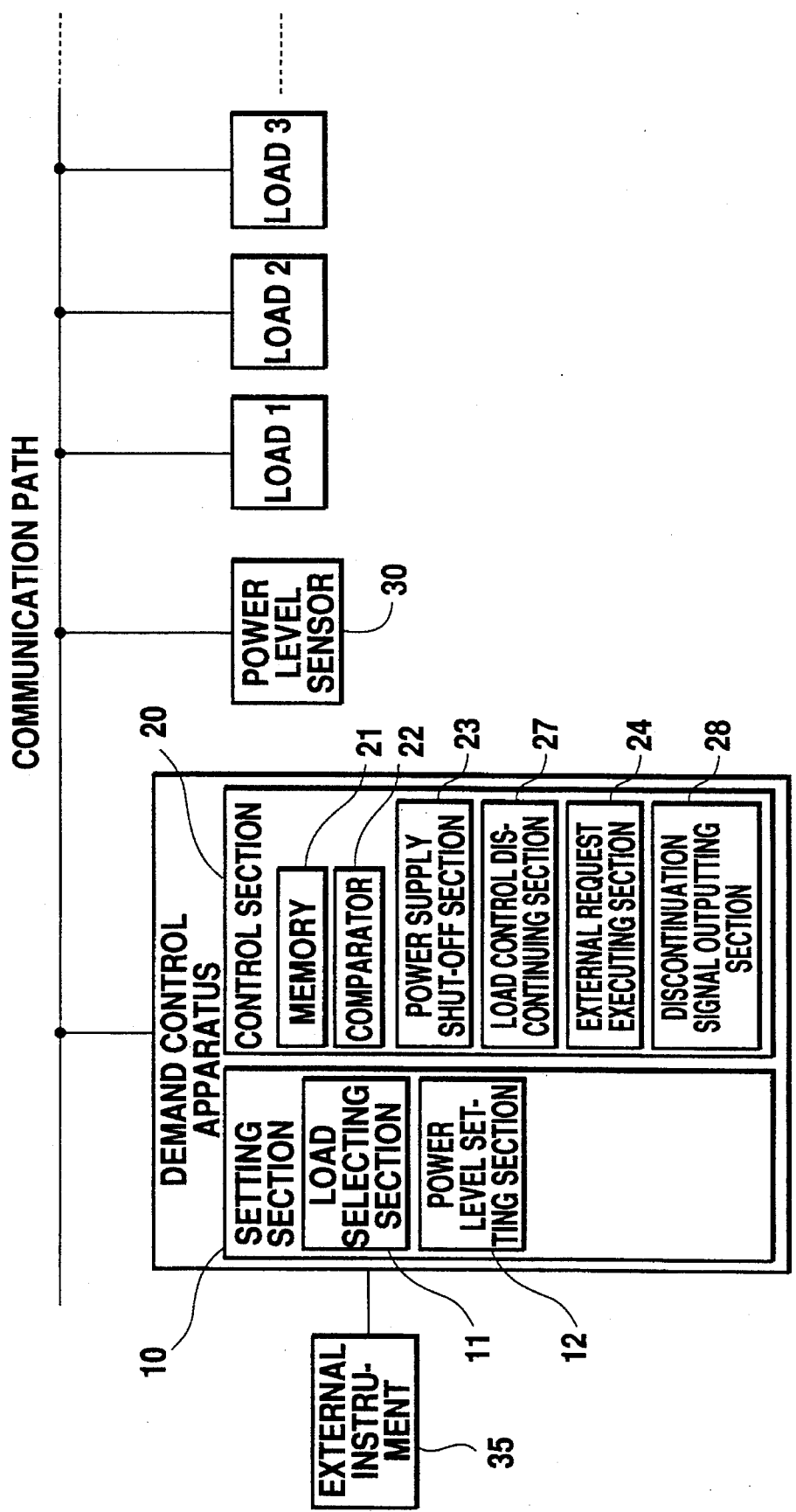
FIG. 18 is a schematic block diagram of a further demand control apparatus.
Figure 19:
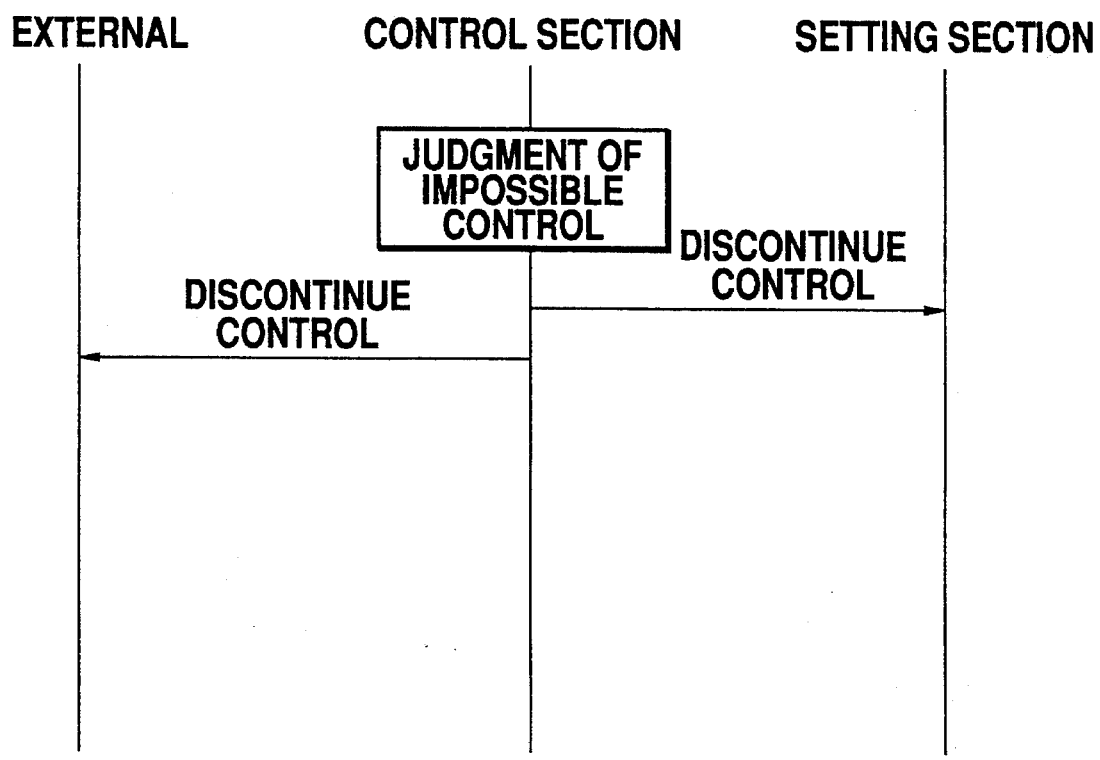
FIG. 19 is a view illustrating the sequence of control in the demand control apparatus shown in FIG. 18.
Figure 20:
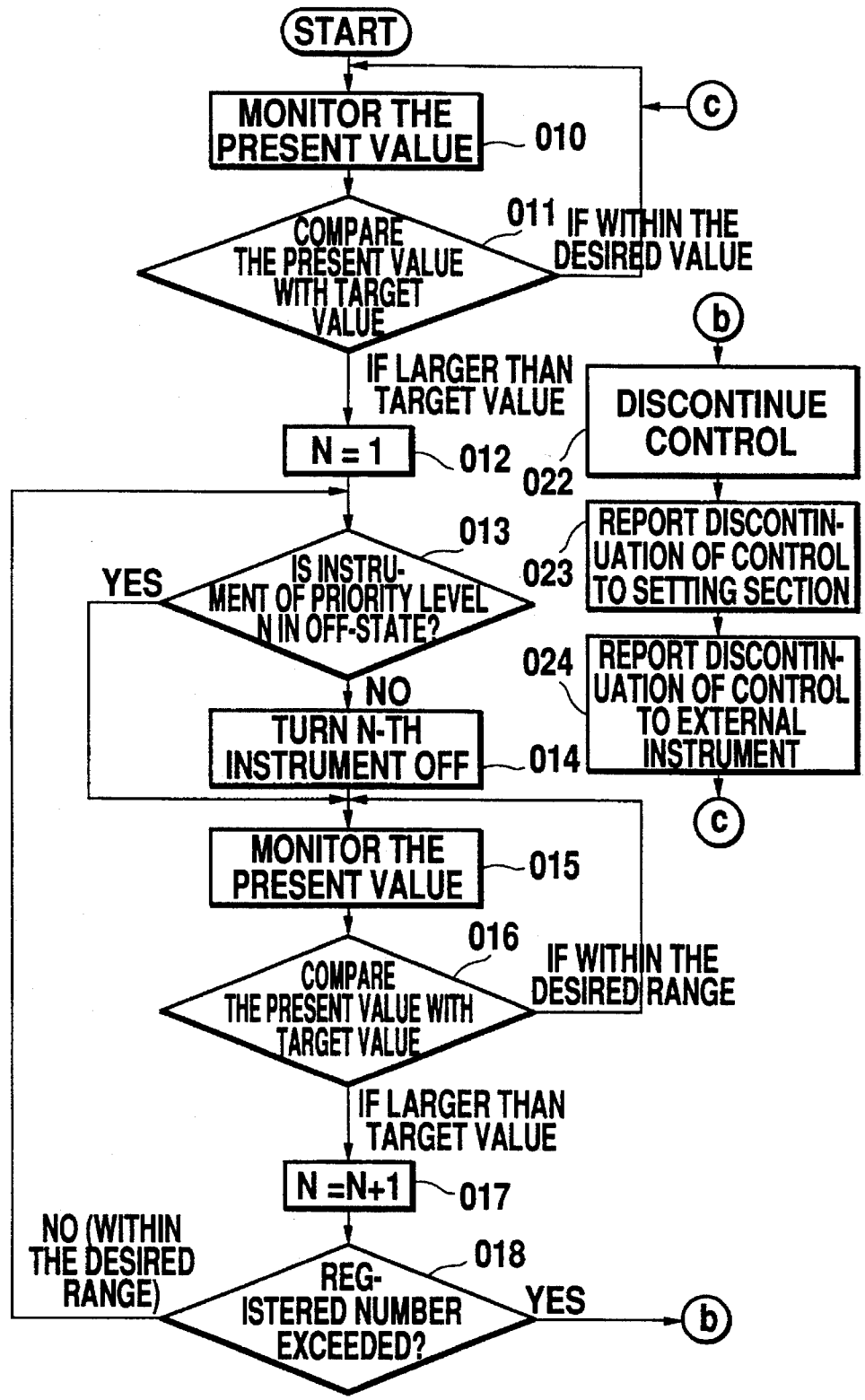
FIG. 20 is a flowchart illustrating the procedure of control in the control section.

Although the seventh embodiment has been described as to the change of target power level when the total quantity of working current exceeds the target power level even if all the loads to be controlled are turned off, it may be intended to discontinue the control rather than change the target power level. This can be accomplished by the eighth embodiment of the present invention shown in FIG. 17. In the eighth embodiment, the control section 20 includes a load control discontinuing section or means 27 and this is reported to the setting section 10. If the demand control apparatus is connected to the external instrument 35 as shown in FIG. 18 which illustrates the ninth embodiment of the present invention, the discontinuation of load control is also reported to the external instrument 35 as shown in FIGS. 19 and 20 (step 024). The steps to 023 in FIG. 20 are common to the eighth embodiment.

Figure 21:
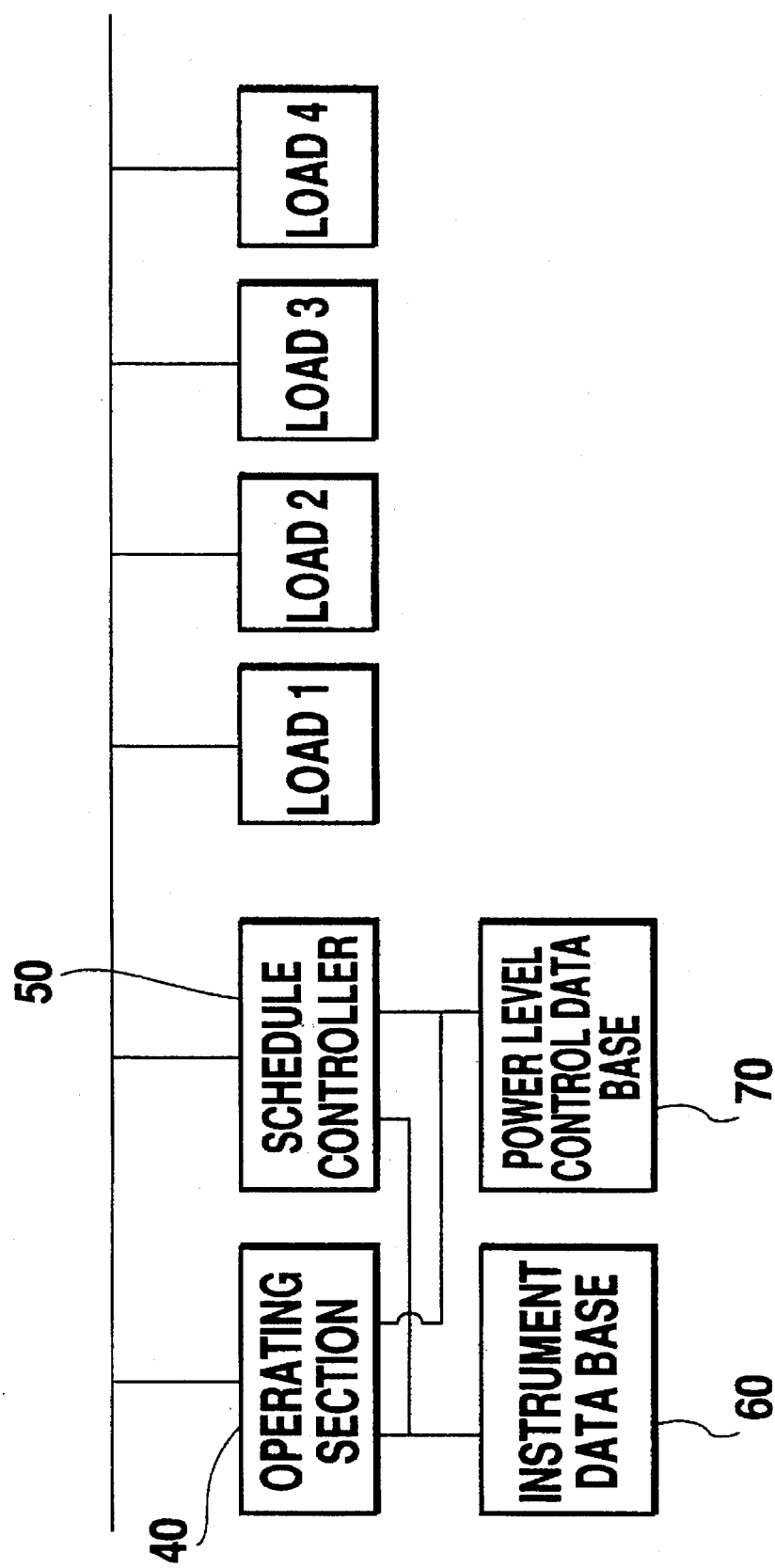
FIG. 21 is a schematic block diagram of a tenth embodiment demand control apparatus.
Figure 22:
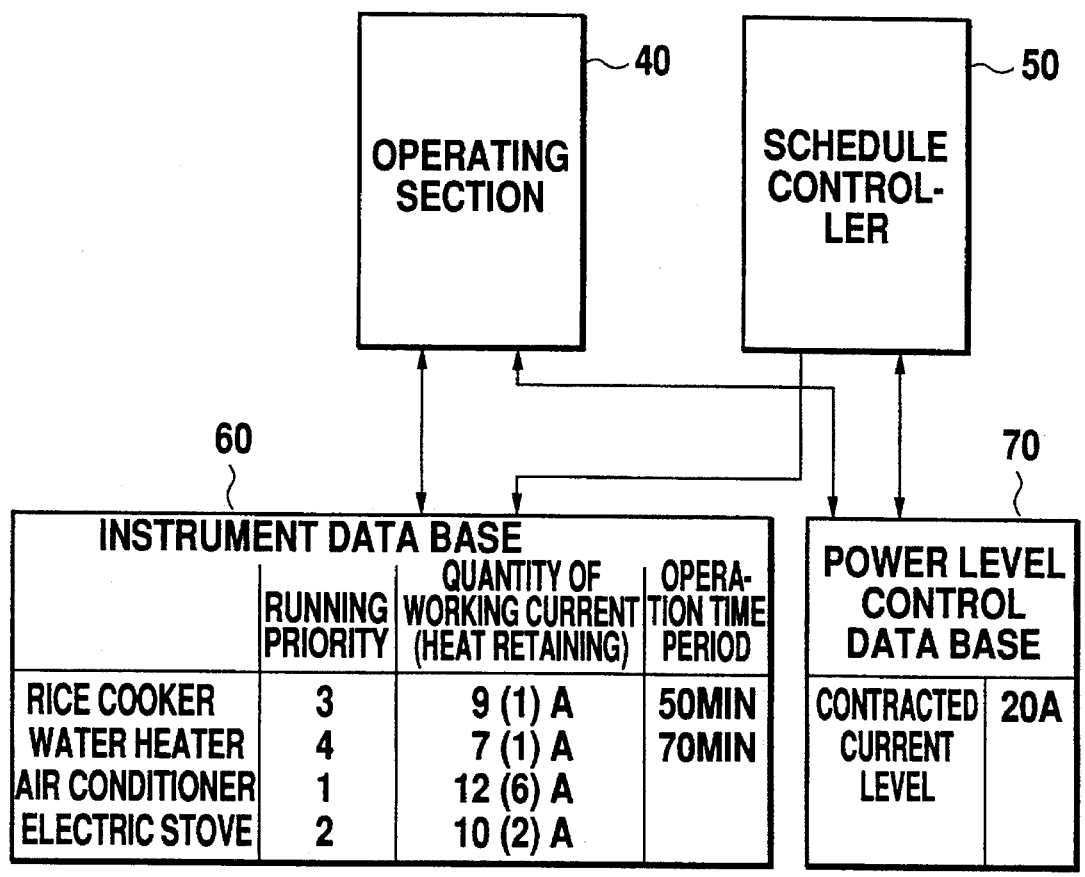
FIG. 22 is a schematic block diagram illustrating the details of part of the apparatus shown in FIG. 21.

As shown in FIG. 21, a demand control apparatus constructed according to the tenth embodiment of the present invention comprises an operating section 40 and a schedule controller (hereinafter called simply "controller") 50, all of which are connected to four loads 1 through 4. The operating section 40 and controller 50 are also connected to an instrument data base 60 and demand control data base 70. The instrument data base 60 has stored tile priority of run, quantity of working current and operating time period of each load, as shown in FIG. 22. If the quantity of working current on operation in a load is intended to have a heat retaining function, the quantity of working current on heat retaining is also stored in the instrument data base 60. The operating time period may be determined for such instruments as a rice cooker and a water heater. The demand control data base 70 has stored the contracted current level.

The operating section 40 can select one or more loads to be controlled from the group of loads and set times at which each of the selected loads is initiated and terminated.

The controller 50 controls the loads according to the selection of load and termination time set by the operating section 40 and data stored In the instrument data base 60 and demand control data base 70 as follows:

As shown in FIG. 23, it is first assumed that the operating section 40 selects the air conditioner having the first priority level, the rice cooker having the third priority level and the water heater having the fourth priority level and sets time initiating the air conditioner at 6:00 a.m. and time terminating the rice cooker and water heater at 7:00 a.m.

Figure 25:
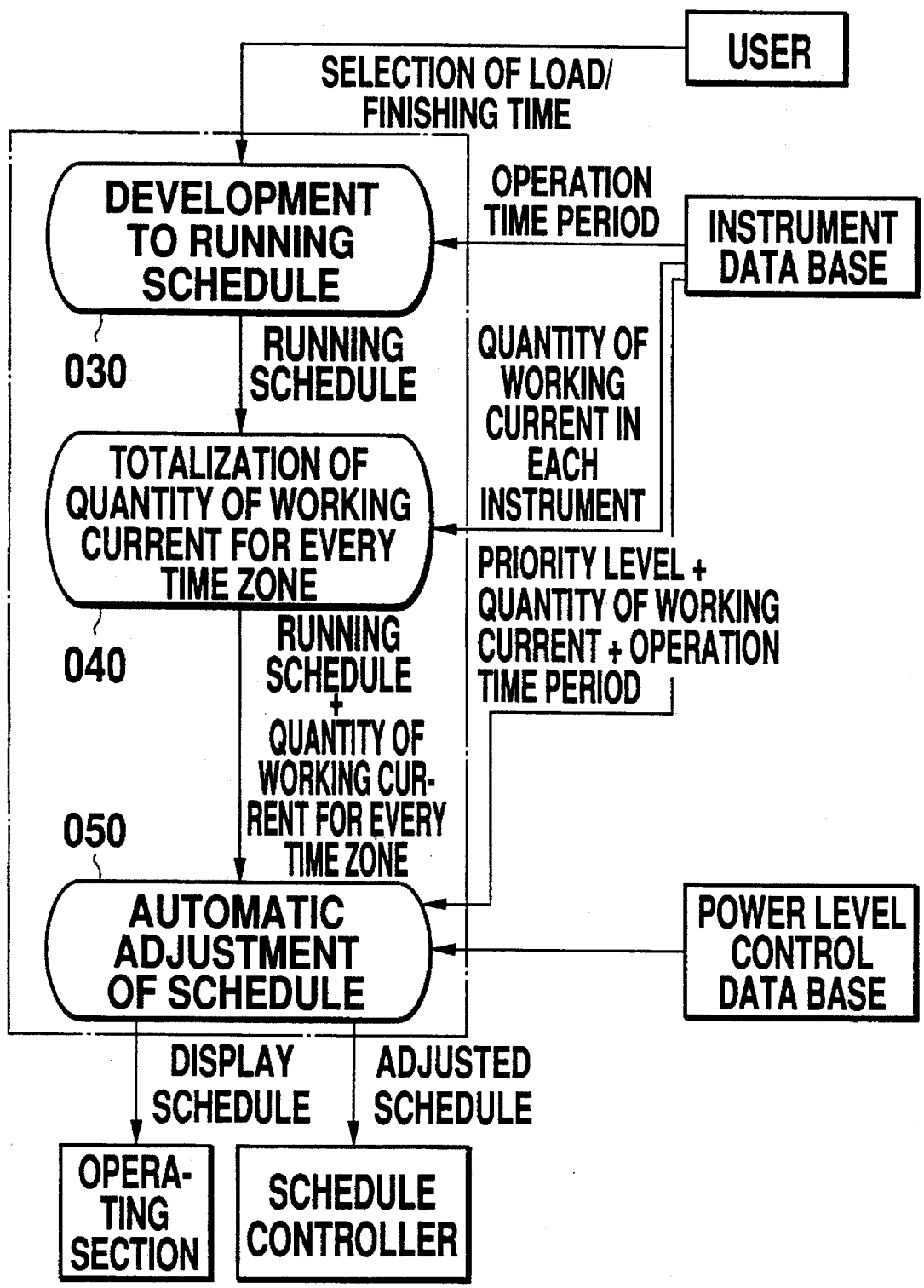
FIG. 25 is a view illustrating the procedure of processing in the schedule controller.

As shown in FIG. 25, the controller 50 develops the running schedule according to the above data set through the operating section 40 by the user and the running time period stored in the instrument data base 60 (step 030). Thus, such a schedule as shown in FIG. 23 will be developed. More particularly, the running initiation time of the rice cooker is at 6:10 a.m. since the running termination time is at 7:00 a.m. and the running time period is for 50 minutes. The water heater has its running initiation time at 5:50 a.m.

The quantities of working current in the respective time zones are then totalized from the running schedule and the quantity of working current in each of the loads which has been stored in the instrument data base 60 (step 040). As seen from FIG. 23, thus, the current level becomes equal to 7 A from 5:60 to 6:00, 19 A from 6:00 to 6:10 and 28 A from 6:10 to 7:00. If it is now assumed that the demand value is 15 A, the total quantity of working current between 6:00 and 7:00 will exceed the demand value. In order to overcome such a problem, the controller 50 automatically regulates the running schedule in accordance with the priority levels, quantities of working current and operating time periods which have been stored in the instrument data base 60 and also the contracted quantity of working current which has been stored in the demand control data base.

Figure 26:
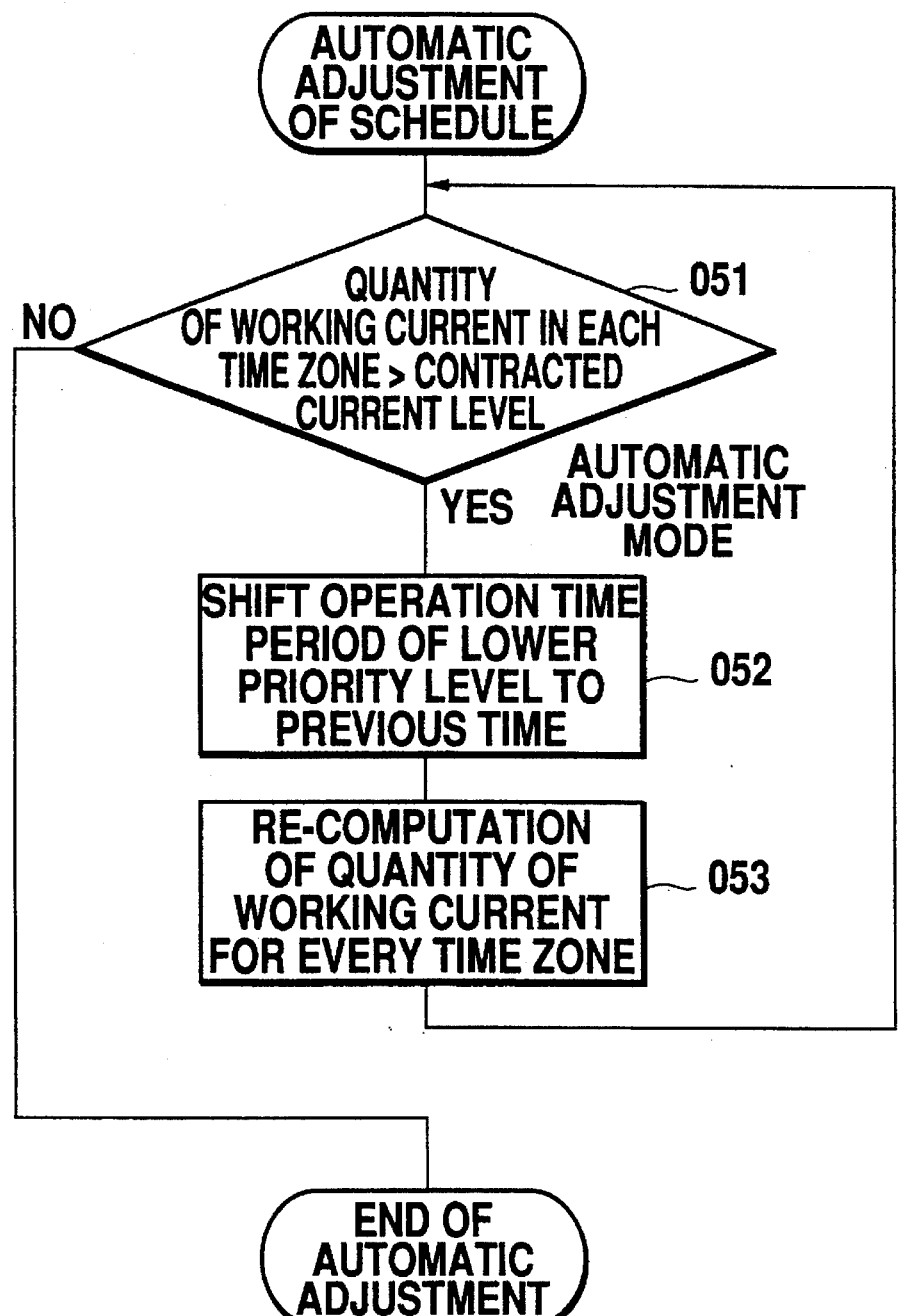
FIG. 26 is a view illustrating the procedure of processing in the automatic schedule adjustment.

Such an automatic adjustment of the schedule can be carried out by comparing the quantity of working current in each of the time zones with the contracted quantity of working current, as shown in FIG. 26. If the quantity of working current is larger than the contracted quantity of working current, the operation time of an instrument having a lower priority level is shifted to the immediately previous operation time (steps 051 and 052) and the quantity of working current is re-computed (step 053). This procedure will be repeated.

More particularly, in FIG. 23, the operation terminating time of the water heater having the lowest priority level is shifted to the operation initiating time of the rice cooker, that is, to 6:10. Since the water heater is placed in its heat retaining cycle through the time period between 6:10 and 7:00, it is assumed that the quantity of working current becomes equal to one A. Therefore, the total quantity of working current becomes equal to 22 A from 6:10 to 7:00. This still exceeds the contracted power level. The operation terminating time of the rice cooker having a higher priority level is thus shifted to the operation initiating time of the air conditioner, that is, 6:00. The quantity of working current in the rice cooker from 6:00 to 7:00 is also equal to one A at this time since it is in its heat retaining state.

Since the total quantity of working current from 6:10 to 7:00 thus becomes equal to 14 A, the total quantity of working current will be within the range defined by the contracted current level. However, the total quantity of working current is still higher than the demand level since it is 19 A from 6:00 to 6:10. Therefore, the operation terminating time of the water heater is shifted to the operation initiating time of the rice cooker. Thus, the automatic adjustment will be as shown in FIG. 24. At any time, therefore, the total quantity of working current can be suppressed to a level, equal to or lower than the demand level.

In such a manner, the present invention can control the demand without de-energization of all the loads to be controlled. Particularly, this is advantageous when it is not desired to shut off the power supply in the morning zone through which kitchen instruments are being used.

A power distribution control system constructed in accordance with the present invention will be described with reference to the drawings.

Figure 27:
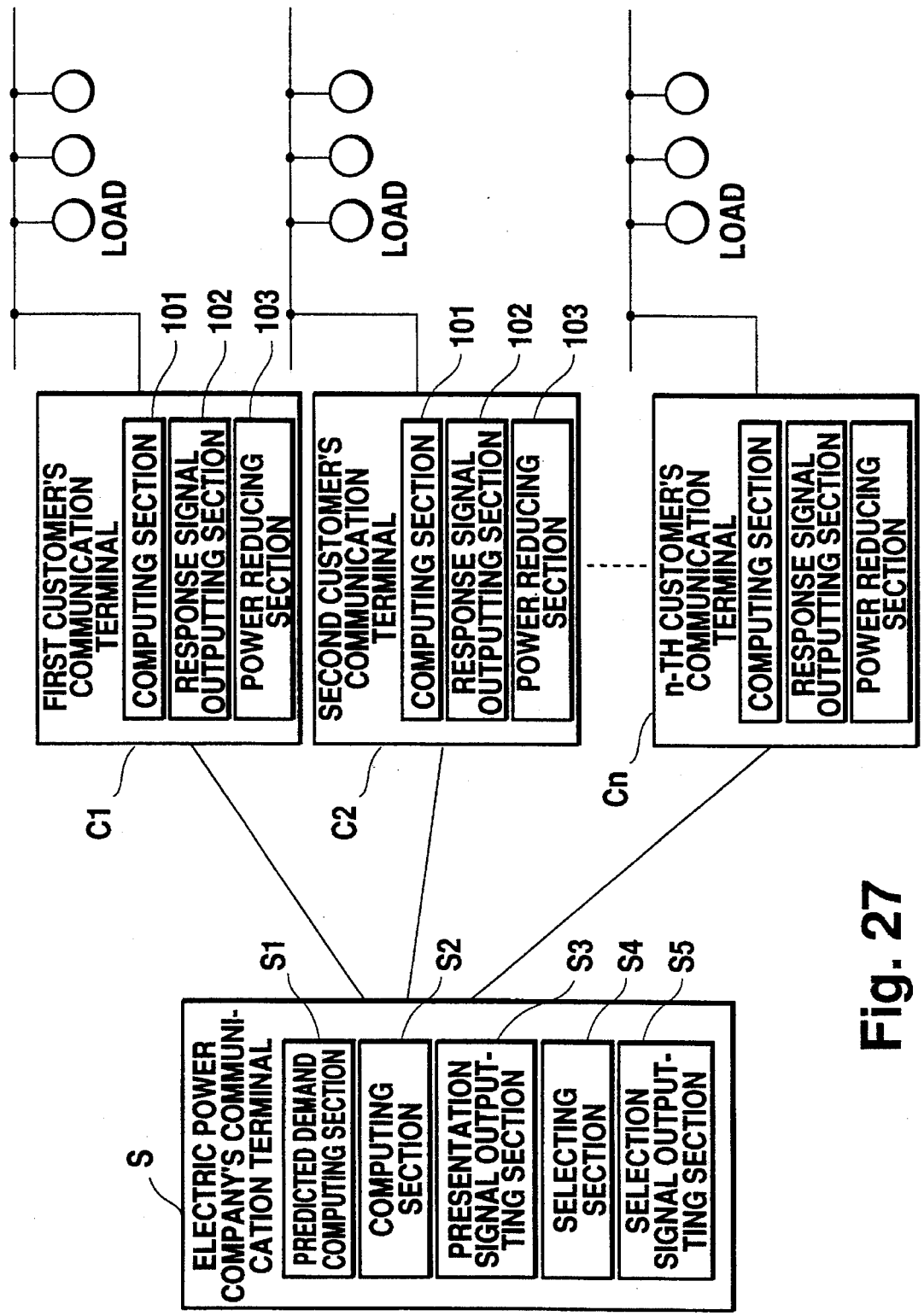
FIG. 27 is a block diagram of an electric power distribution system according to the eleventh embodiment of the present invention.

Referring to FIG. 27. The power distribution control system, which is the eleventh embodiment of the present invention, comprises an electric power company's communication terminal S or center communication terminal and a plurality of customer's communication terminals C1 to Cn connected to the center communication terminal through the respective communication lines. Each of the customer's communication terminals is connected to a corresponding load which has been installed in a house, factory or the like.

The center communication terminal S comprises a predicted demand calculating section S1 which is adapted to receive input signals relating to, for example, present demand (X1), season (X2), day of the week (X3), time (X4), air temperature (X5), event schedule (X6), possible audience rating (X7) and so on. Thus, a predicted demand U1 will be computed from a function U1=F1 (X1, X2, X3, X4, X5, X6, . . . ). The computation of the predicted demand may be carried out for periods of very thirty minutes.

The predicted demand is then compared with a power supply capacity to judge whether or not it should be considered to reduce the number of loads. Even if the predicted demand does not exceed the power supply capacity, there may be a case when it is desired to reduce the demand in place of the incentive payment without increase of the electric power generation having its critical cost. The critical cost may be computed from the predicted demand to judge whether or not it should be considered to reduce the number of loads. The incentive payment is a compensation returned back to a customer in place of the reduction of electric power level and proportional to the reduced quantity of electric power.

The center communication terminal S also comprises a computing section S2. When it should be considered to reduce the number of loads, the computing section S2 determines a time zone through which the predicted demand computed exceeds the power supply capacity to compute a load reduction time period and to determine the incentive payment level. The incentive payment depends on the critical cost, the past response from the customer and so on.

Figure 28:
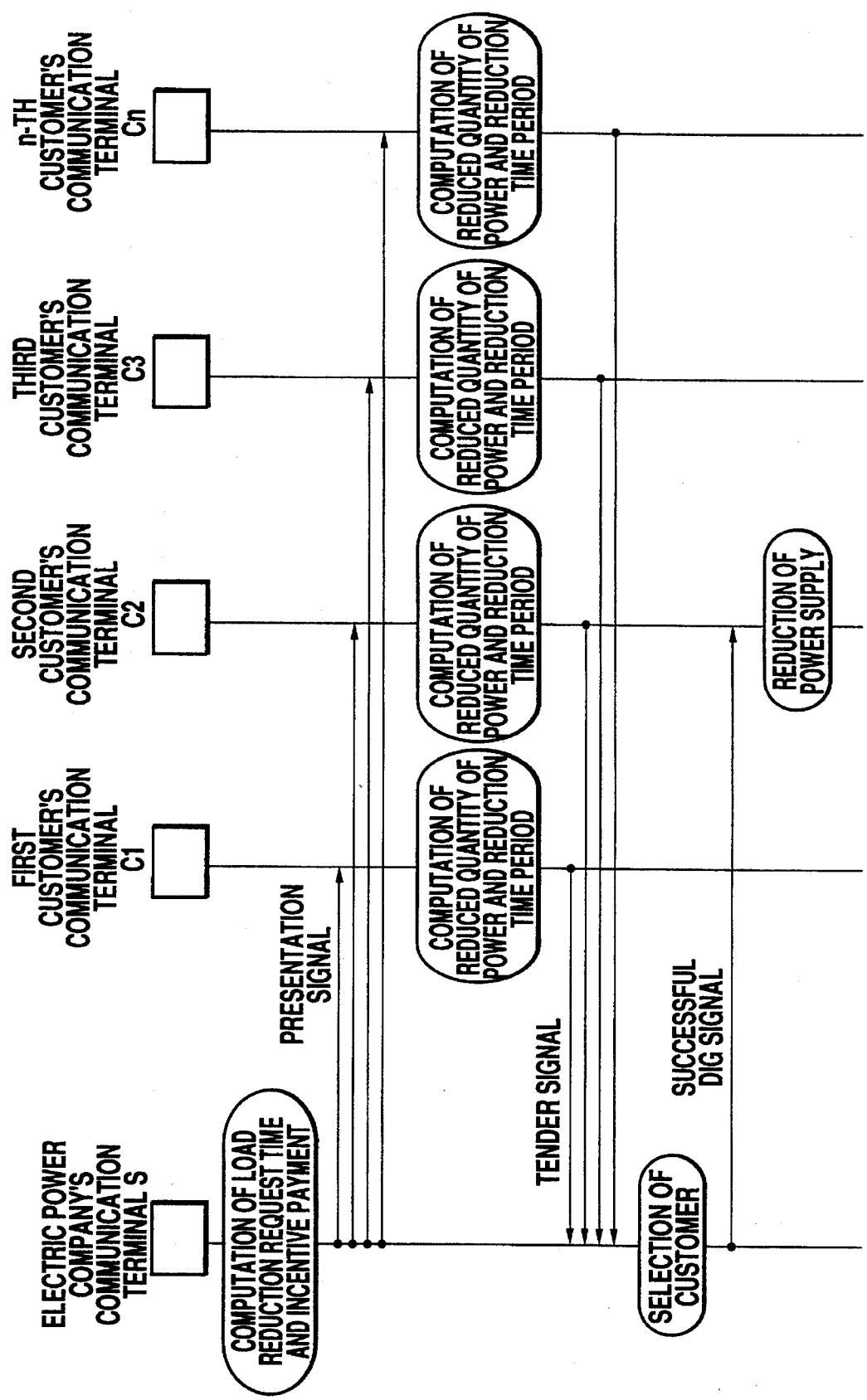
FIG. 28 is a view illustrating the operation of the power distribution system according to the eleventh embodiment of the present invention.

The center communication terminal further comprises a presentation signal outputting section or means S3 which outputs and sends a presentation signal including the load reduction time period and incentive payment to the respective one of the customer's communication terminals C1 to Cn, as shown in FIG. 28.

When each of the customer's communication terminals C1 to Cn receives a presentation signal, its computing section 101 checks a potential of reduction resulting in a reduction factor considering the load reduction request time and the incentive payment, it is now judged whether or not the reduction of the supplied power is possible. If it is possible, the computing section 101 computes the quantity and time period of power to be reduced. The potential for reduction includes event and operation schedule (Xc1), reduction of air conditioner load (Xc2), running time shift in water heater (Xc3), partial stoppage of elevator (Xc4), partial lights-out (Xc5), partial stoppage of computer (Xc6), amount of loss due to partial shutdown of operations in a factory (Xc7) and so on. The potential of reduction Xc is computed from the above factors.

If there is a reduction of electric power, the reduced quantity of power U2 and the reduction time period U3 are computed from functions, U2=F2 (Xa, Xb and Xc) and U3=F3 (Xa, Xb and Xc), considering the load reduction request time period (Xa) and incentive payment (Xb)in the presentation signal and the computed potential of reduction (Xc). When the computing section 101 in each of the center communication terminals C1 to Cn computes the reduced amount of power and reduction time period, a response signal outputting section or means 102 outputs a tender signal functioning as a response signal containing the reduced amount of power and reduction time period to the center communication terminal S. A customer's communication terminal may decide not to output a tender signal depending on the contents of a presentation signal from the center communication terminal S.

When the center communication terminal S receives the tender signal, its selecting section S4 selects customers from the functions including parameters such as the reduction time period and reduced amount of power. For example, the selected customers may be any number of customers in the higher rank which has an increased product of the reduced amount of power times the reduction time period in each of the tender signals. Namely, a successful bid is made. After selection of the customers, a selection signal outputting section or means S5 in the center communication terminal S sends a successful bid signal as a selection signal including the reduced amount of power, the reduction time period and the incentive payment to each of the customer's communication terminals selected. As shown in FIG. 28, for example, if the second customer's communication terminal C2 is selected, a successful bid signal is provided thereto. The reduced amount of power, the reduction time period and the incentive payment in tile successful bid signal sent are computed from the reduced amount of power and reduction time period in the tender signal from each of the customer's communication terminals. A non-selection signal may be provided to the other customer's communication terminals which are not selected. The aforementioned successful bid signal may be a simple selection signal which does not include the reduced amount of power, the reduction time period and the incentive payment.

When each of the customer's communication terminals receives a successful bid signal, its power reducing section or means 103 reduces the power supply to the group of connected loads, in accordance with the reduced amount of power and reduction time period in the successful bid signal.

The present invention further provides the twelfth embodiment which is different from the above embodiment in that the center communication terminal outputs a presentation signal including only the load reduction request time period and each of the customer's communication terminals computes an incentive wage from the load reduction request time period and the potential of reduction in the presentation signal. The center communication terminal then receives a tender signal as a response signal including the computed incentive payment and selects one or more customers which have a lower in incentive payment than the other customers. Thus, the center communication terminal may send a successful bid signal as a selection signal to each of the selected customer's communication terminals.

As the thirteenth embodiment of the present invention, the center communication terminal may output a presentation signal containing only the load reduction request time period and each of the customer's communication terminals computes the reduced amount of power, the reduction time period and the incentive payment from the load reduction request time period and the potential of reduction in the presentation signal. The center communication terminal then receives a tender signal from that customer's communication terminal, which is a response signal containing the computed reduced amount of power and reduction time period and the incentive payment and selects one or more customers from the functions having parameters such as the reduced amount of power and the reduction time period. Thus, the center communication terminal may send a successful bid signal as a selection signal to each of the customer's communication terminals.

Figure 29:
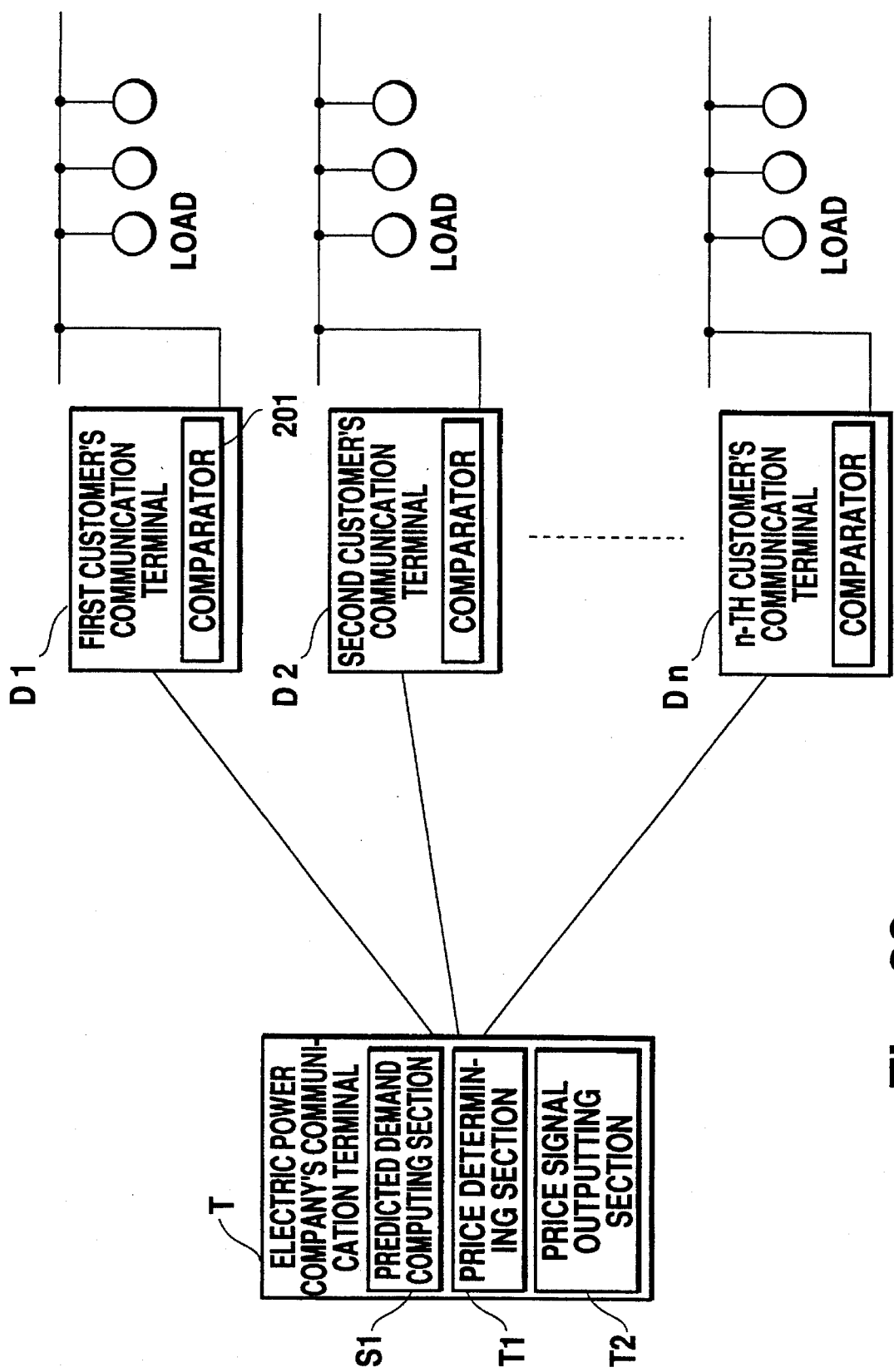
FIG. 29 is a block diagram of the fourteenth electric power distribution system.

In the fourteenth embodiment shown in FIG. 29 of the present invention, a plurality of customer's communication terminals D1 to Dn are connected to an electric power company's communication terminal or center communication terminal T, as in the first embodiment. The center communication terminal T comprises a predicted demand computing section S1 for computing a predicted demand U1 from a function Ui=F1 (X1, X2, X3, X4, X5, X6, . . . ) when the center communication terminal receives present demand (X1), season (X2), day of the week (X3), time (X4), air temperature (X5), event schedule (X6), possible audience rating (X7) and so on, and a price determining section or means T1 for comparing the predicted demand with the power supply capacity to determine an electric power price. More particularly. If the predicted demand exceeds the power supply capacity, the power price is set to be relatively high. This is because the demand is prevented from exceeding the power supply capacity and also because if the demand is too high, the rate of heating in a power plant using coal and petroleum having increased unit costs for power generation is increased. On the contrary, if the predicted demand is lower than tile power supply capacity, the power price is set to be relatively low so that a proper profit can be obtained by the electric power company. The determination of power price may be carried out for every thirty minute period.

When the power price is determined, a price signal outputting section or means T2 in the center communication terminal T outputs a power price signal containing the determined power price to each of the customer's communication terminals connected D1 to Dn to the center communication terminal. The fourteenth embodiment can be mainly applied to cases where the customers are provided with independent electric power plants. More particularly, each of the customer's communication terminals comprises a comparator section 201 for comparing tile power price contained in the power price signal send from the center communication terminal T with the power generation cost of the independent power plant and for selecting any one of these which is advantageous for that customer. If the parameters in the above function include an additional parameter indicative of the amount of buying schedule on the customer side X8, this may have been previously reported to the center communication terminal through the customer's communication terminal of the customer to determine the demand schedule.

The fourteenth embodiment is advantageous in that it can provide the reduction of equipment and communication costs, in comparison with the eleventh, twelfth and thirteenth embodiments.

Figure 30:
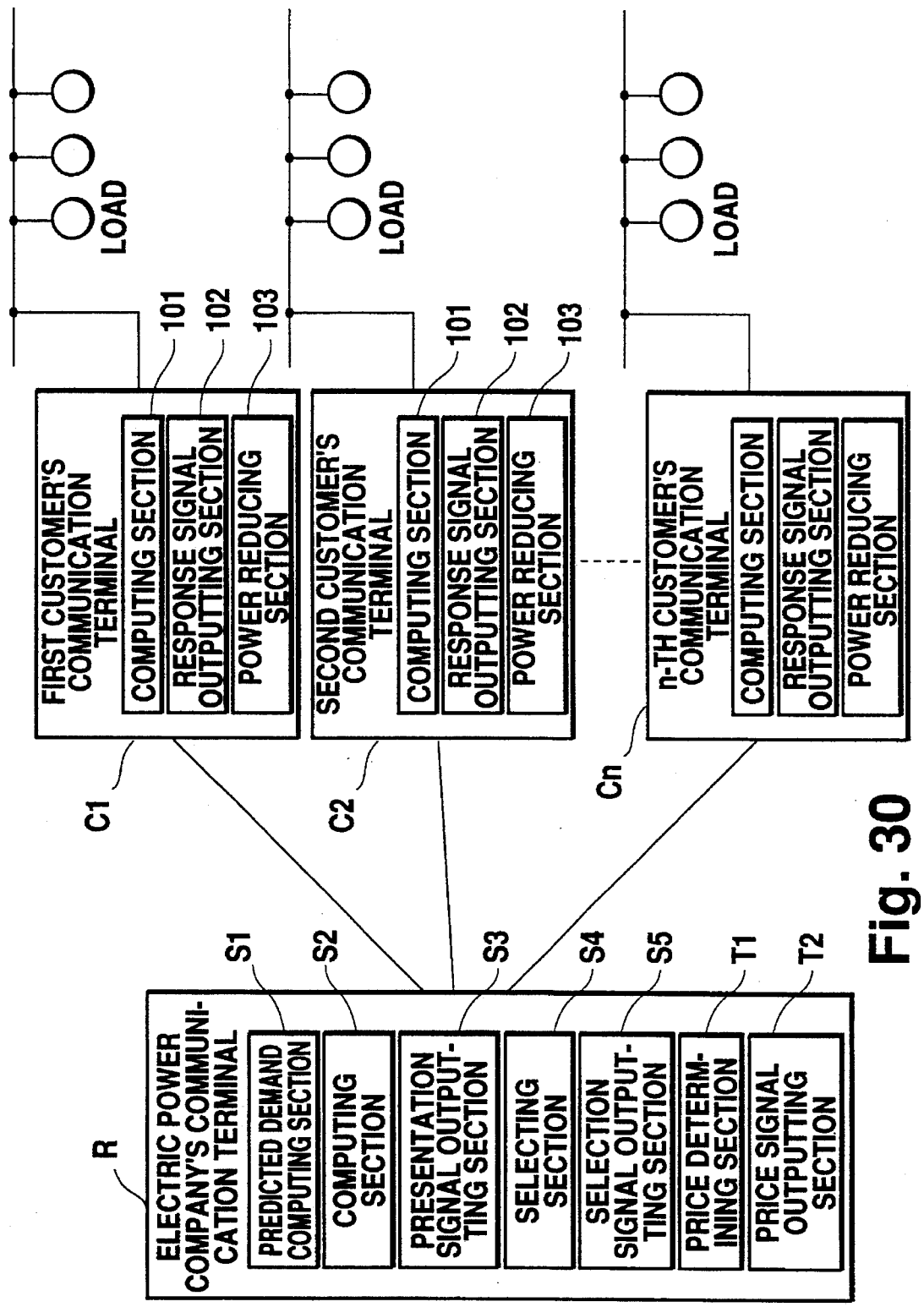
FIG. 30 is a block diagram of a fifteenth embodiment of the present invention.
Figure 31:
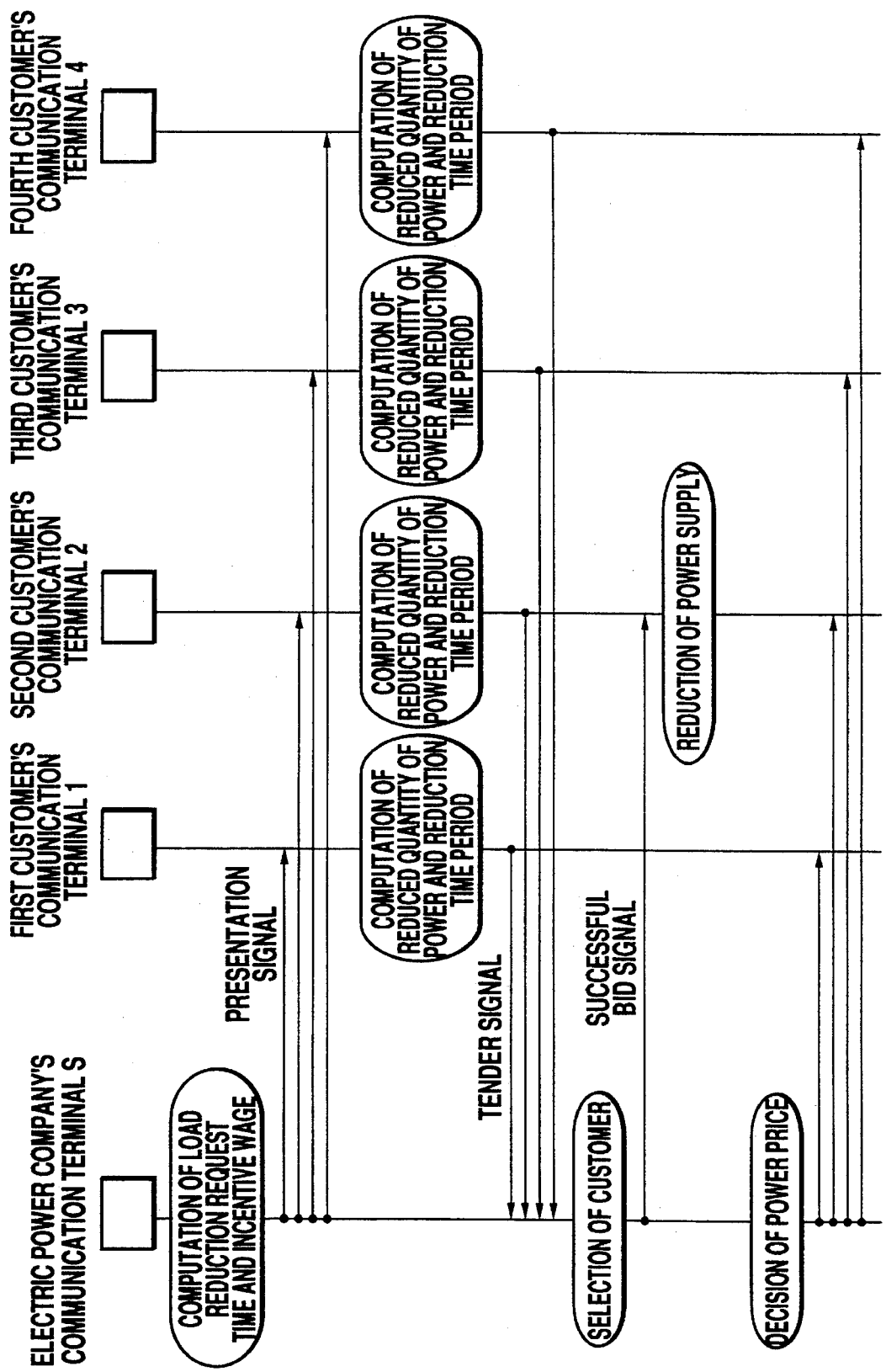
FIG. 31 is a view illustrating the operation of the electric power distribution system of the fifteenth embodiment.

The fifteenth embodiment of the present invention is a combination of the eleventh embodiment with the fourteenth embodiment. The fifteenth embodiment is adapted to execute the power distribution control cycles shown by the eleventh and fifteenth embodiments alternately at given time intervals. More particularly, as shown in FIG. 30, the center communication terminal R comprises a predicted demand computing section S1, a computing section S2, a presentation signal outputting section S3, a selecting section S4, a selection signal outputting section S4, a price determining section T1 and a price signal outputting section T2. As shown in FIG. 31, the center communication terminal R executes the outputs of a selection and price signals alternately to each of the customer's communication terminals. The fifteenth embodiment can more finely control the power distribution than the previous embodiments.

Alternatively, the fifteenth embodiment may alternately execute the controls of the twelfth and fourteenth embodiments or the controls of the thirteenth and fourteenth embodiments.

We claim:

1. A demand control apparatus connected to a group of loads and adapted to shut off a power supply to loads in accordance with set priority levels so that a total quantity of working current in the group of loads will be equal to or lower than a set quantity of current, said apparatus comprising:

power detecting means for computing a quantity of working current in each of the loads from a difference in the total quantity of working current before and after shutoff of the power supply to each of said loads; and restart control means for comparing the quantity of working current in each of said loads with a difference between the set quantity of current and the total quantity of working current at a present time in accordance with information of the quantity of working current in each of the loads detected by said power detecting means, and for controlling the restart of one or more loads in accordance with the set priority levels of the loads and said difference between the set quantity of current and the total quantity of working current at the present time.

2. A demand control apparatus connected to a group of loads and adapted to shut off a power supply to loads in accordance with set priority levels so that a total quantity of working current in the group of loads will be equal to or lower than a set quantity of current, said apparatus comprising:

registration means for registering and storing a quantity of working current for each of said loads; and shutoff control means for comparing the quantity of working current for each of the loads with the set quantity of current when the total quantity of working current exceeds the set quantity of current, and for selecting one or more of the loads to be in an on state, each of the selected loads having a quantity of working current equal to or lower than the set quantity of current and a sum of the total quantity of working current of the selected loads being equal to or lower than the set quantity of current, the selected loads being selected in accordance with the set priority levels of said selected loads, said shutoff control means being also adapted to turn all loads other than said selected loads off.

3. A demand control apparatus connected to a group of loads so that a total quantity of working current in the group of loads can be equal to or lower than a set quantity of current, said apparatus comprising: receiving means for receiving a power usage request from each of said loads; and demand control means for responding to the power usage request and for outputting a signal including a possible quantity of working current to the load which has provided the power usage request.

4. A demand control apparatus connected to a group of loads and adapted to shut off a power supply to loads in accordance with set priority levels so that a total quantity of working current in the group of loads will be equal to or lower than a set quantity of current, said apparatus comprising:

a setting section; and a control section:

wherein said setting section includes:

load selecting means for selecting one or more loads to be controlled from the group of loads, and for specifying priority levels of the selected loads; and power level setting means for setting a target power level for load control; and wherein said control section includes:

memory means for storing the selected loads selected by said load selecting means, the priority levels of the selected loads and the target power level set by said power level setting means;

comparator means for comparing the target power level stored in the memory means with the total quantity of working current;

power supply shutoff means for shutting off the power supply to the selected loads in accordance with the priority levels of the selected loads stored in the memory means; and load control discontinuing means for discontinuing load control when the total quantity of working current exceeds the target power level after shutting off the power supply to the selected loads.

5. A demand control apparatus as defined in claim 4, further comprising an external instrument connected to said demand control apparatus and wherein said control section further comprises external request executing means responsive to a control request signal from said external instrument for executing the control request signal when the selection of loads, the priority levels and the target power level have been stored.

6. A demand control apparatus as defined in claim 4 wherein said control section further comprises changing means for changing the target power level and also outputting the changed target power level to said setting section when the total quantity of working current still exceeds the target power level after shut-off by said power supply shut-off means.

7. A demand control apparatus as defined in claim 6, further comprising an external instrument connected to said demand control apparatus and wherein said control section further comprises external request executing means responsive to a control request signal from said external instrument for executing the control request signal when the selection of loads, the priority levels and the target power level have been stored, and changed level signal outputting means for outputting a signal containing the changed target power level to said external instrument when the target power level has been changed.

8. A demand control apparatus as defined in claim 4, further comprising an external instrument connected to said demand control apparatus and wherein said control section further includes external request executing means responsive to a control request signal from said external instrument for responding to the control request signal to provide data regarding the selection of loads, the priority levels and the target power level, and a discontinuation signal outputting means for providing a discontinuation signal to the external instrument that indicates the discontinuation of load control.

9. A demand control apparatus connected to a group of loads so that a total quantity of working current in the group of loads can be suppressed to be equal to or lower than a set quantity of current, said apparatus comprising:

an operating section;

a data base section; and a control section;

wherein said operating section includes;

selection means for selecting one or more loads to be controlled from the group of loads; and time setting means for setting information of operation initiating times and operation terminating times in each of said selected loads;

wherein said data base section stores data relating to a quantity of working current of each of the loads, a quantity of working current for each function of each of the loads, a standard operation time of each of the loads, a priority level for each of the loads and the set quantity of current; and wherein said control section includes control means for controlling the total quantity of working current to a level equal to or lower than the set quantity of current by shifting the operation terminating times of each of the selected loads to be controlled in accordance with its priority level when the total quantity of working current exceeds the set quantity of current at any time where said selected loads are operating.

10. A power distribution control system comprising:

a center communication terminal; and a plurality of customer's communication terminals operatively connected to said center communication terminal through communication lines, each customer's communication terminal being connected to a plurality of corresponding loads;

said center communication terminal including:

presentation signal outputting means for outputting a presentation signal containing a load reduction request time period and an incentive payment to each of said customer's communication terminals; and selection signal outputting means responsive to response signals from said customer's communication terminals for outputting at least one selection signal to one or more customer's communication terminals based on parameters relating to a reduced quantity of power and a reduction time period in the response signals: and each of said customer's communication terminals including:

response signal outputting means for outputting a response signal to said center communication terminal, said response signal containing the reduced quantity of power and the reduction time period, wherein, the reduced quantity of power and the reduction time period are computed from the load reduction request time period, and the incentive payment contained in the presentation signal from said center communication terminal, and one or more potentials of reduction; and power reduction means for reducing a power supply to the corresponding plurality of loads for a given time period, based on the selection signal from said center communication terminal.

11. A power distribution control system as defined in claim 10 wherein said selection signal outputting means of the center communication terminal is adapted to output a selection signal containing the reduction time period, the reduced quantity of power and the incentive payment which are computed from the reduced quantity of power and the reduction time period in the response signal from each of said customer's communication terminals.

12. A power distribution control system as defined in claim 11, wherein said center communication terminal further includes:

predicted demand computing means for computing a predicted demand from a demand predicting potential;

price determining means for comparing said predicted demand with a power supply capacity to determine an electric power price; and price signal outputting means for outputting a power price signal containing the determined power price to each of said customer's communication terminals.

13. A power distribution control system as defined in claim 10, wherein said center communication terminal further includes:
predicted demand computing means for computing a predicted demand from a demand predicting potential;
price determining means for comparing said predicted demand with a power supply capacity to determine an electric power price; and
price signal outputting means for outputting a power price signal containing the determined power price to each of said customer's communication terminals.

14. A power distribution control system comprising:
a center communication terminal; and
a plurality of customer's communication terminals operatively connected to said center communication terminal through communication lines, each customer's communication terminal being connected to a corresponding plurality of loads;
said center communication terminal including:
presentation signal outputting means for outputting a presentation signal containing a load reduction request time period and an incentive payment to each of said customer's communication terminals; and
selection signal outputting means responsive to response signals from said customer's communication terminals for outputting at least one selection signal to one or more customer's communication terminals based on a product of a reduced quantity of power and a reduction time period in the response signals,
each of said customer's communication terminals including:
response signal outputting means for outputting a response signal to said center communication terminal, said response signal containing the reduced quantity of power and the reduction time period, wherein, the reduced quantity of power and reduction time period are computed from the load reduction request time period, the incentive payment, and one or more reduction potentials; and
power reduction means for reducing a power supply to the corresponding plurality of loads for a given time period, based on the selection signal from said center communication terminal.

15. A power distribution control system as defined in claim 14 wherein said selection signal outputting means of the center communication terminal is adapted to output a selection signal containing the reduction time period, the reduced quantity of power and the incentive payment which are computed from the reduced quantity of power and the reduction time period in the response signal from each of said customer's communication terminals.

16. A power distribution control system as defined in claim 15, wherein said center communication terminal further includes:
predicted demand computing means for computing a predicted demand from a demand predicting potential;
price determining means for comparing said predicted demand with a power supply capacity to determine an electric power price; and
price signal outputting means for outputting a power price signal containing the determined power price to each of said customer's communication terminals.

17. A power distribution control system as defined in claim 14, wherein said center communication terminal further includes;
predicted demand computing means for computing a predicted demand from a demand predicting potential;
price determining means for comparing said predicted demand with a power supply capacity to determine an electric power price; and
price signal outputting means for outputting a power price signal containing the determined power price to each of said customer's communication terminals.

18. A power distribution control system comprising:
a center communication terminal; and
a plurality of customer's communication terminals operatively connected to said center communication terminal through communication lines, each customer's communication terminal being connected to a corresponding plurality of loads;
said center communication terminal including:
presentation signal outputting means for outputting a presentation signal containing a load reduction request time period to each of said customer's communication terminals; and
selection signal outputting means responsive to response signals from said customer's communication terminals for outputting at least one selection signal to one or more customer's communication terminals each of which has a reduced incentive payment; and
each of said customer's communication terminals including:
response signal outputting means for outputting a response signal to said center communication terminal, said response signal containing an incentive payment computed from the load reduction request time period contained in the presentation signal and a plurality of reduction potentials; and
power reduction means for reducing a power supply to the corresponding plurality of loads for a given time period, based on the selection signal from said center communication terminal.

19. A power distribution control system as defined in claim 18, wherein said center communication terminal further includes:
predicted demand computing means for computing a predicted demand from a demand predicting potential;
price determining means for comparing said predicted demand with a power supply capacity to determine an electric power price; and
price signal outputting means for outputting a power price signal containing the determined power price to each of said customer's communication terminals.

20. A power distribution control system comprising:
a center communication terminal; and
a plurality of customer's communication terminals operatively connected to said center communication terminal through communication lines, each customer's communication terminal being connected to a corresponding plurality of loads;
said center communication terminal including:
presentation signal outputting means for outputting a presentation signal containing a load reduction request time period; and
selection signal outputting means responsive to response signals from said customer's communication terminals for outputting at least one selection signal to one or more customer's communication terminals based on parameters relating to a reduced quantity of power, a reduction time period and an incentive payment;

each of said customer's communication terminals including:

response signal outputting means for outputting a response signal to said center communication terminal, said response signal containing the reduced quantity of power, the reduction time period and the incentive payment, each of which are computed from the load reduction request time period contained in the presentation signal from said center communication terminal, and one or more reduction potential; and power reduction means for reducing a power supply to the corresponding plurality of loads for a given time period, based on the selection signal from said center communication terminal.

21. A power distribution control system as defined in claim 20, wherein said center communication terminal further includes:

predicted demand computing means for computing a predicted demand from a demand predicting potential;

price determining means for comparing said predicted demand with a power supply capacity to determine an electric power price; and price signal outputting means for outputting a power price signal containing the determined power price to each of said customer's communication terminals.

22. A power distribution control system comprising:

a center communication terminal; and a plurality of customer's communication terminals operatively connected to said center communication terminal through communication lines, each customer's communication terminal being connected to a corresponding plurality of loads;

said center communication terminal including:

predicted demand computing means for computing a predicted demand from a demand predicting potential;

price determining means for comparing said predicted demand with a power supply capacity to determine an electric power price; and price signal outputting means for outputting a power price signal containing a determined power price to each of said customer's communication terminals.

23. A power distribution control system comprising:

a central communication terminal including:

means tier outputting a request signal containing a first set of power reduction parameters including cost savings incentives;

means for receiving a response signal; and means for outputting a selection signal, containing a third set of power reduction parameters, to customers selected for power reduction; and a plurality of customer communication terminals coupled to the central communication terminal and to a corresponding plurality of loads powered from a power distribution system, each customer communication terminal including:

means for receiving the request signal from the central communication terminal;

means for computing a second set of power reduction parameters based on the first set of power reduction parameters;

means for outputting a response signal to the central communication terminal, the response signal containing the second set of power reduction parameters; and power reduction means for reducing power to the corresponding plurality of loads based on the third set of power reduction parameters received from the central communication terminal.

24. The power distribution system of claim 23 wherein:

the first set of parameters includes a requested time period of power reduction;

the second set of parameters includes a proposed time period of power reduction, and a proposed quantity of power reduction.

25. The power distribution system of claim 24 wherein the selection means of the central communication terminal selects customers based upon a product of the proposed time period of power reduction and the proposed quantity of power reduction contained in each response signal.

26. The power distribution system of claim 23, wherein the third set of parameters includes a reduction time period, a reduced quantity of power, and a cost savings incentive.

27. The power distribution system of claim 23, wherein:

the second set of parameters includes a proposed cost savings incentive; and the selection means selects a customer based upon the proposed cost savings incentive contained in each response signal.

28. The power distribution control system of claim 23, wherein the central communication terminal further includes predicted demand computing means for computing a predicted demand, and price determining means for comparing said predicted demand with a power supply capacity to determine an electric power price; and wherein the first set of parameters includes the electric power price.

29. A method for controlling power in a power distribution system comprising steps of:

A. sending a power reduction request for power reduction from a central control terminal to a plurality of customer sites, the request including cost savings incentives;

B. receiving proposals for power reduction from each customer site; and

C. selecting one or more of the proposals received from the customers.

30. The method of claim 29, wherein the request to each customer includes a time period for power reduction, and a quantity of power reduction.

31. The method of claim 29, wherein each proposal includes a time period for power reduction and a quantity of power reduction.

32. The method of claim 29, wherein each proposal includes a cost incentive proposal, and wherein the selecting of one or more of the proposals is based on cost.

33. The method of claim 29, further including an initial step of predicting future power demands, and wherein the request for power reduction of step A is based on a prediction generated by the step of predicting future power demand.

* * * * *